US012416305B2

(12) United States Patent
Foster et al.

(10) Patent No.: US 12,416,305 B2
(45) Date of Patent: Sep. 16, 2025

(54) FLUID END ASSEMBLY

(71) Applicant: Kerr Machine Co., Sulphur, OK (US)

(72) Inventors: Kelcy Jake Foster, Sulphur, OK (US); Mark S. Nowell, Ardmore, OK (US); Brandon Scott Ayres, Ardmore, OK (US); Christopher Todd Barnett, Stratford, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 19/094,069

(22) Filed: Mar. 28, 2025

(65) Prior Publication Data

US 2025/0223962 A1 Jul. 10, 2025

Related U.S. Application Data

(63) Continuation of application No. 18/953,750, filed on Nov. 20, 2024, now Pat. No. 12,286,969, which is a
(Continued)

(51) Int. Cl.
*F04B 53/22* (2006.01)
*F04B 1/0408* (2020.01)
(Continued)

(52) U.S. Cl.
CPC ............ *F04B 53/22* (2013.01); *F04B 1/0408* (2013.01); *F04B 1/0421* (2013.01); *F04B 1/122* (2013.01); *F04B 1/145* (2013.01); *F04B 1/16* (2013.01); *F04B 1/18* (2013.01); *F04B 53/16* (2013.01); *F16B 35/005* (2013.01); *F16B 39/24* (2013.01); *F16B 43/00* (2013.01); *F05B 2260/301* (2013.01)

(58) Field of Classification Search
CPC ........ F04B 53/22; F04B 53/16; F04B 1/0408; F04B 1/0421; F04B 1/122; F04B 1/145; F04B 1/16; F04B 1/18; F16B 35/005; F16B 39/24; F16B 43/00; F05B 2260/301
See application file for complete search history.

(56) References Cited

U.S. PATENT DOCUMENTS

| 3,005,412 A | 10/1961 | Camp |
| 3,053,500 A | 9/1962 | Atkinson |

(Continued)

FOREIGN PATENT DOCUMENTS

WO WO2014144113 A2 9/2014

OTHER PUBLICATIONS

*GD Energy Products, LLC* (Petitioner) v. *Kerr Machine Co.* (Patent Owner) Petition to Institute an Inter Partes Review for U.S. Pat. No. 12,152,582, Feb. 6, 2025, 165 pages.

*Primary Examiner* — Patrick C Williams
(74) *Attorney, Agent, or Firm* — Tomlinson McKinstry, P.C.

(57) ABSTRACT

A fluid end having its fluid flow bores sealed without threading a retaining nut into the walls of each bore. The fluid ends may be assembled using a plurality of different kits that each comprise a fluid end body, a component, a retainer element, and a fastening system. The retainer element holds the component within each of the bores formed in the fluid end body and the fastening system secures the retainer element to the body. The fastening system comprises a plurality of externally threaded studs, washers and nuts in some embodiments. In other embodiments, the fastening system comprises a plurality of screws.

13 Claims, 15 Drawing Sheets

Related U.S. Application Data continuation of application No. 18/321,054, filed on May 22, 2023, now Pat. No. 12,152,582, which is a continuation of application No. 17/882,267, filed on Aug. 5, 2022, now Pat. No. 11,655,812, which is a continuation of application No. 16/876,414, filed on May 18, 2020, now Pat. No. 11,408,419, which is a continuation of application No. 16/035,126, filed on Jul. 13, 2018, now Pat. No. 10,670,013.

(60) Provisional application No. 62/562,588, filed on Sep. 25, 2017, provisional application No. 62/536,297, filed on Jul. 24, 2017, provisional application No. 62/532,574, filed on Jul. 14, 2017.

(51) Int. Cl.

| | | |
|---|---|---|
| *F04B 1/0421* | (2020.01) | |
| *F04B 1/122* | (2020.01) | |
| *F04B 1/145* | (2020.01) | |
| *F04B 1/16* | (2006.01) | |
| *F04B 1/18* | (2020.01) | |
| *F04B 53/16* | (2006.01) | |
| *F16B 35/00* | (2006.01) | |
| *F16B 39/24* | (2006.01) | |
| *F16B 43/00* | (2006.01) | |

(56) References Cited

U.S. PATENT DOCUMENTS

| | | |
|---|---|---|
| 3,146,724 A | 9/1964 | Cornelson |
| 3,427,988 A | 2/1969 | Redman et al. |
| 3,679,332 A | 7/1972 | Yohpe |
| 4,432,386 A | 2/1984 | Pacht |
| 4,520,837 A | 6/1985 | Cole et al. |
| 4,758,135 A | 7/1988 | Woodward et al. |
| 4,768,933 A | 9/1988 | Stachowiak |
| 4,771,801 A | 9/1988 | Crump et al. |
| 4,773,833 A | 9/1988 | Wilkinson et al. |
| 4,861,241 A | 8/1989 | Gamboa et al. |
| 5,073,096 A | 12/1991 | King et al. |
| 5,226,445 A | 7/1993 | Surjaatmadja |
| 5,362,215 A | 11/1994 | King |
| 6,167,959 B1 | 1/2001 | Bassinger et al. |
| 7,290,560 B2 | 11/2007 | Orr et al. |
| 7,296,591 B2 | 11/2007 | Moe et al. |
| 7,335,002 B2 | 2/2008 | Vicars |
| 7,506,574 B2 | 3/2009 | Jensen et al. |
| 7,866,346 B1 | 1/2011 | Walters |
| 8,100,407 B2 | 1/2012 | Stanton |
| 8,360,094 B2 | 1/2013 | Steinbock et al. |
| 8,365,754 B2 | 2/2013 | Riley et al. |
| 9,188,121 B1 | 11/2015 | Dille |
| 10,082,137 B2 | 9/2018 | Graham et al. |
| 10,221,847 B2 | 3/2019 | Dyer |
| 10,519,950 B2 | 12/2019 | Foster |
| 10,760,567 B2 | 9/2020 | Salih et al. |
| D933,104 S | 10/2021 | Ellisor et al. |
| 2004/0234404 A1 | 11/2004 | Vicars |
| 2006/0002806 A1 | 1/2006 | Baxter |
| 2009/0123303 A1 | 5/2009 | Ohnishi |
| 2010/0038070 A1 | 2/2010 | Blanco et al. |
| 2011/0189040 A1 | 8/2011 | Vicars |
| 2011/0206547 A1 | 8/2011 | Kim |
| 2011/0236238 A1 | 9/2011 | Cordes |
| 2012/0141308 A1 | 6/2012 | Saini |
| 2013/0202458 A1 | 8/2013 | Byrne et al. |
| 2013/0319220 A1 | 12/2013 | Luharuka |
| 2014/0348677 A1 | 11/2014 | Moeller |
| 2015/0132157 A1 | 5/2015 | Whaley et al. |
| 2017/0211565 A1 | 7/2017 | Morreale |
| 2017/0218951 A1 | 8/2017 | Graham et al. |
| 2019/0011051 A1 | 1/2019 | Yeung |
| 2020/0232455 A1 | 7/2020 | Blume |
| 2021/0270382 A1 | 9/2021 | Sherbeck et al. |
| 2022/0390029 A1 | 12/2022 | Pendleton et al. |

FLUID END ASSEMBLY

SUMMARY

The invention is directed to a kit comprising a fluid end body, a component, a retainer element, and a fastening system. The body comprises an external surface, and a bore extending through the body and terminating at an opening formed in the external surface. The component is configured for removable installation within the bore, and the retainer element is engageable with the component when the component is installed within the bore. The fastening system is configured to releasably hold the retainer element against the component when the component is installed within the bore. The bore has no internal threads formed within that portion that surrounds the component when the component is installed within the bore.

BRIEF DESCRIPTION OF THE DRAWINGS

FIG. 1 shows a suction and discharge end of the fluid end.

FIG. 4 shows a suction and discharge end of the fluid end.

FIG. 7 shows a suction and discharge end of the fluid end.

FIG. 9 shows a suction and discharge end of the fluid end.

FIG. 12 shows a suction and discharge end of the fluid end.

FIG. 14 shows a suction and discharge end of the fluid end.

DETAILED DESCRIPTION

Fluid end assemblies are typically used in oil and gas operations to deliver highly pressurized corrosive and/or abrasive fluids to piping leading to the wellbore. The assemblies are typically attached to power ends run by engines. The power ends reciprocate plungers within the assemblies to pump fluid throughout the fluid end. Fluid may be pumped through the fluid end at pressures that range from 5,000-15,000 pounds per square inch (psi). Fluid used in high pressure hydraulic fracturing operations is typically pumped through the fluid end at a minimum of 8,000 psi; however, fluid will normally be pumped through the fluid end at pressures around 10,000-15,000 psi during such operations.

In fluid end assemblies known in the art, the fluid flow passages or bores formed within the fluid end body are typically sealed by inserting a plug into each bore. A large retaining nut is then installed into each bore above the plug. The retaining nuts typically thread into internal threads formed in the walls of each bore.

In operation, the high level of fluid pressure pumping throughout the fluid end may cause the retaining nuts to back off or unthread from their installed position. When a retaining nut unthreads from its installed position, the plug it was retaining may be displaced by fluid pressure. Displacement of the plug allows fluid to leak around the plug and erode the walls of the bore. The internal threads formed in the bores for engagement with the retaining nuts are also known to crack over time. Erosion of the bore walls or cracking of the internal threads typically requires repair or replacement of the fluid end.

The present invention is directed to a plurality of different fluid ends having bores sealed without threading retaining nuts into the walls of each bore. As a result, the fluid ends of the present invention do not have internal threads formed in their bores proximate the bore openings. Removal of the internal threads eliminates the problems associated with the internal thread failures and the retaining nuts becoming unthreaded from the bores.

Figure 1:
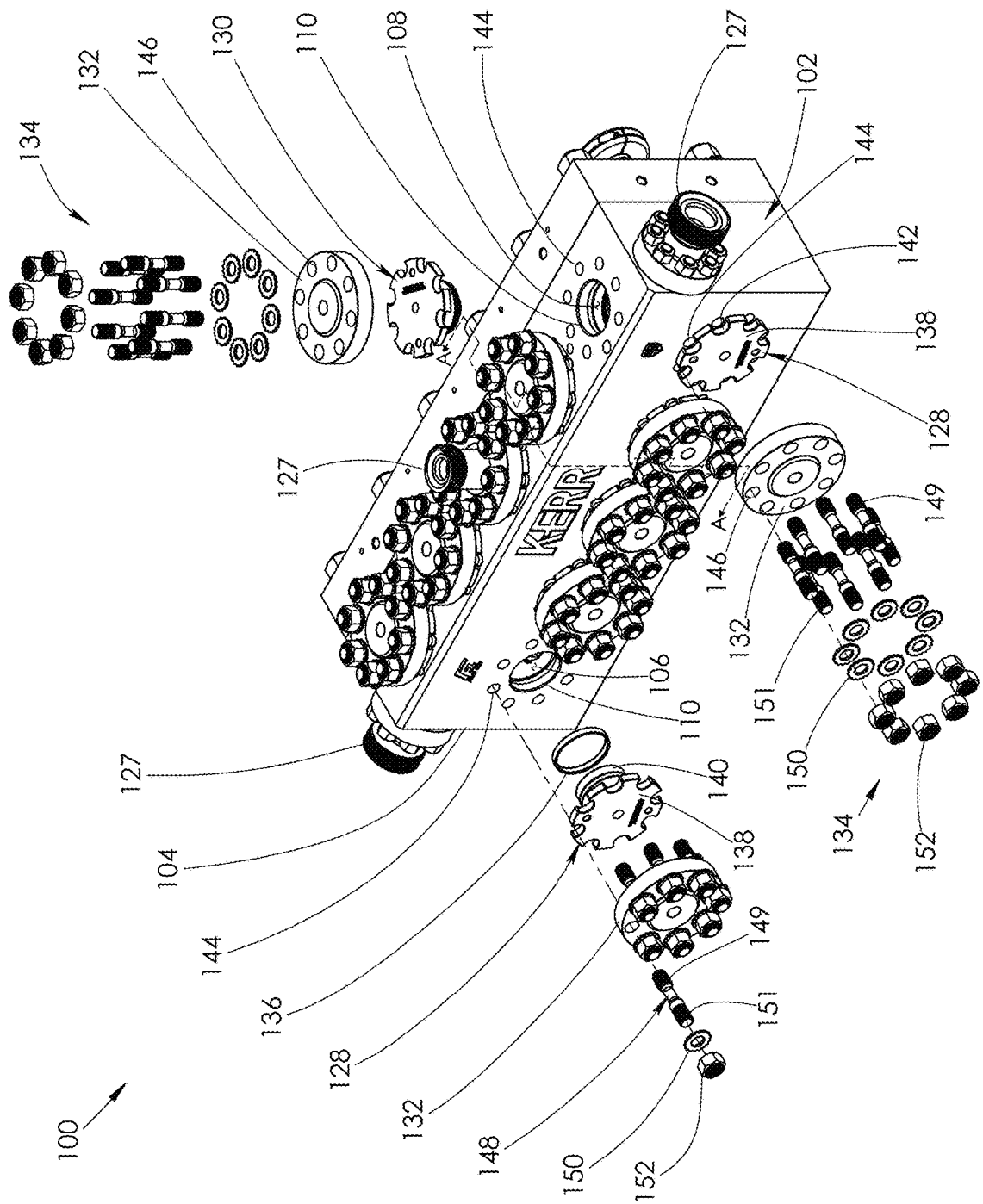
FIG. 1 is a partially exploded view of a first embodiment of a fluid end of the present invention.
Figure 3:
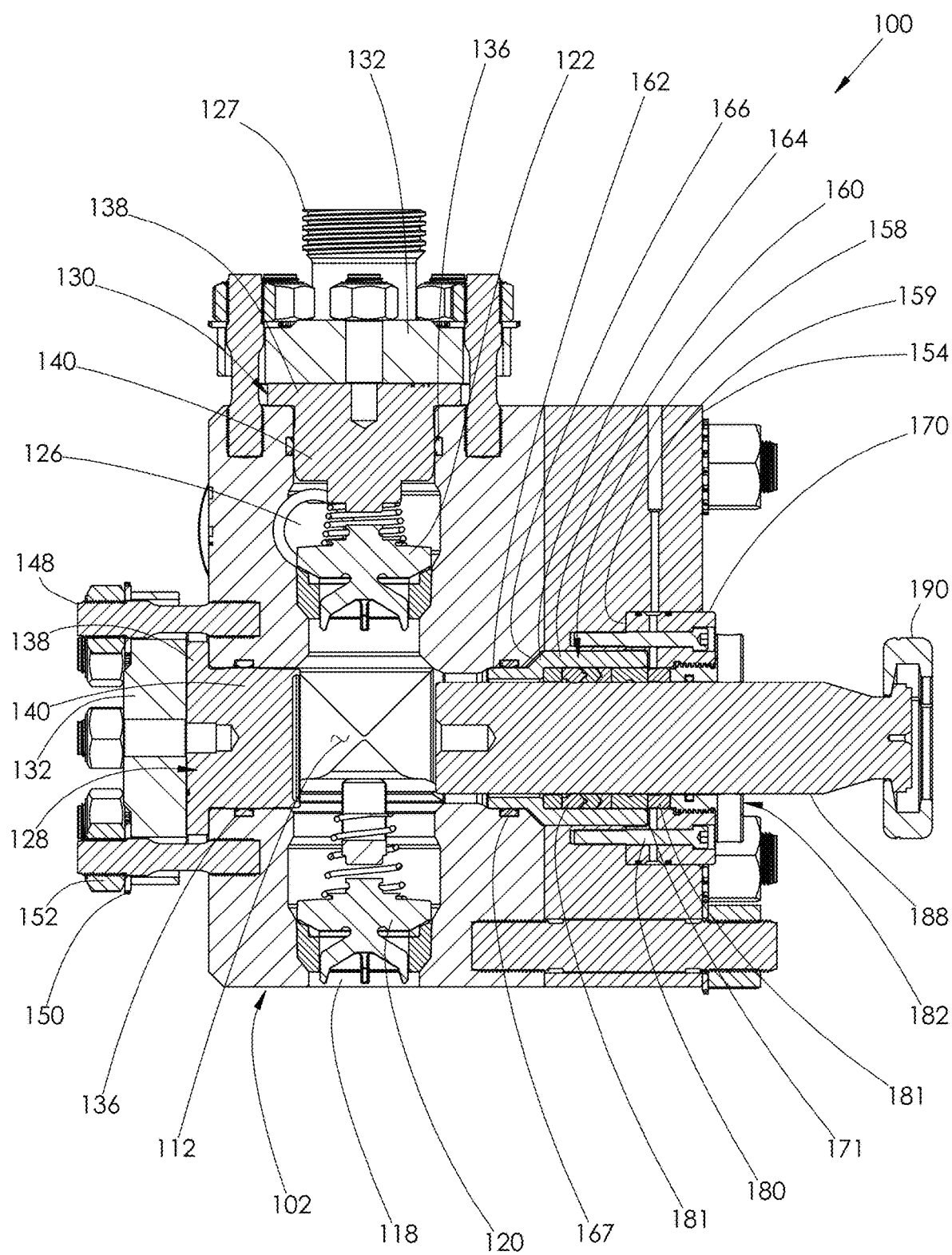
FIG. 3 is a cross-sectional view of the fluid end shown in FIG. 1, taken along line A-A.

With reference to FIGS. 1 and 3, a first embodiment of a fluid end 100 is shown. The fluid end 100 comprises a fluid end body 102 having a flat external surface 104 and a plurality of first and second bores 106, 108 formed adjacent one another therein, as shown in FIG. 1. Preferably, the number of first bores 106 equals the number of second bores 108. More preferably, each first bore 106 intersects its paired second bore 108 within the fluid end body 102 to form an internal chamber 112, as shown in FIG. 3.

Figure 4:
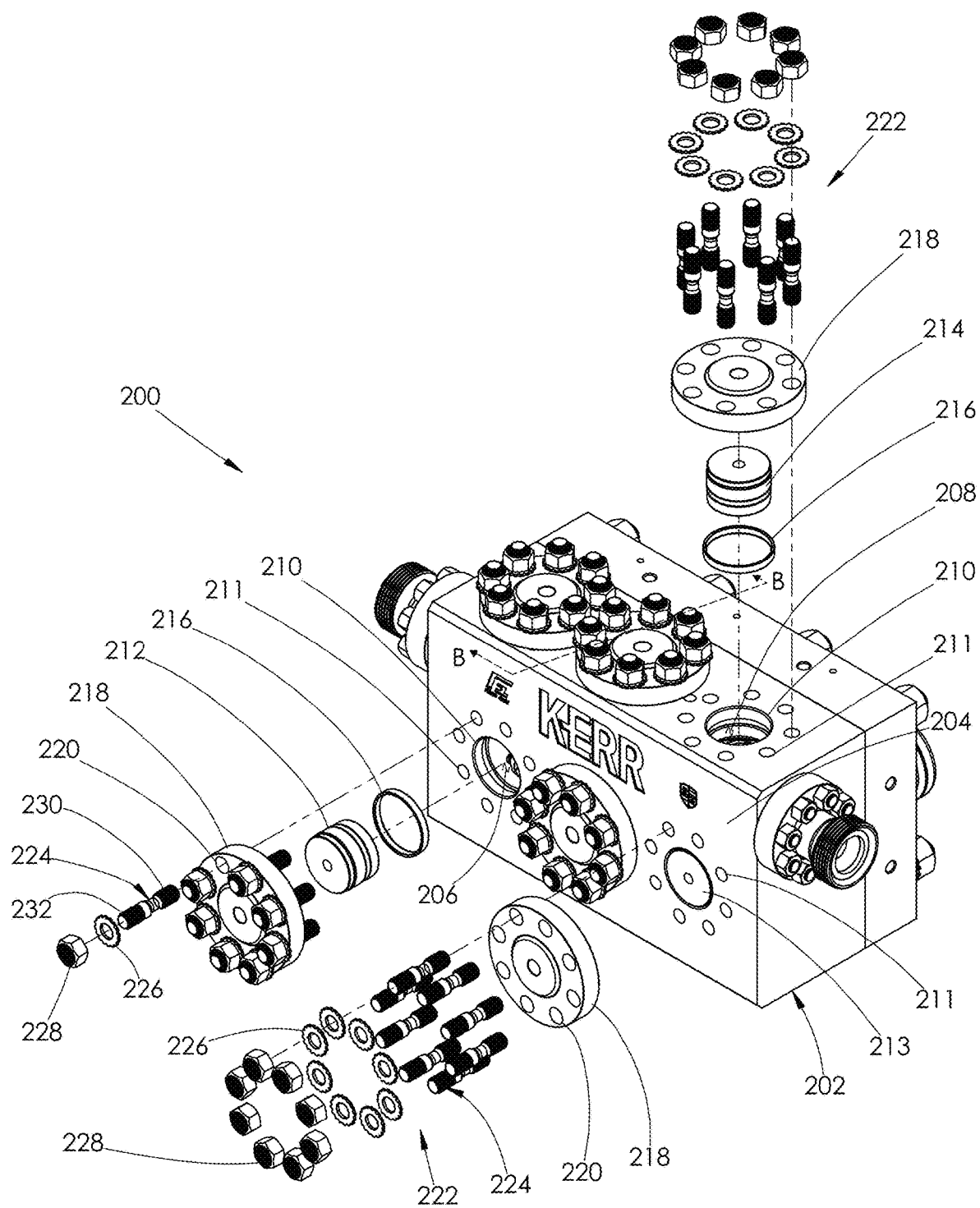
FIG. 4 is a partially exploded view of a second embodiment of a fluid end.

FIG. 1 shows five first and second bores 106, 108. In alternative embodiments, the number of sets of paired first and second bores in the fluid end body may be greater than five, or less than five. Thus, FIG. 4 shows a fluid end body that includes three sets of paired first and second bores. Each bore of each set of paired bores 106 and 108 terminates in a corresponding opening 110 formed in the external surface 104. The bores 106 and 108 and openings 110 exist in one-to-one relationship. A plurality of internally threaded openings 144 are formed in the body 102 and uniformly spaced around each bore opening 110, as shown in FIG. 1.

With reference to FIG. 3, each second bore 108 may have an intake opening 118 formed proximate the bottom end of the fluid end body 102. Each intake opening 118 is connected in one-to-one relationship to a corresponding coupler or pipe. These couplers or pipes are fed from a single common piping system (not shown).

A pair of valves 120 and 122 are positioned within each second bore 108. The valves 120, 122 route fluid flow within the body 102. The intake valve 120 blocks fluid backflow through the intake opening 118. The discharge valve 122 regulates fluid through one or more discharge openings 126. A plurality of couplers 127 may be attached to each discharge opening 126 for connection to a piping system (not shown), as shown in FIG. 1.

Continuing with FIGS. 1 and 3, the fluid end 100 further comprises a plurality of sets of components 128 and 130. The number of sets preferably equals the number of sets of paired first and second bores 106 and 108 formed in the body 102. The component 128 is positioned within a first bore 106, and the component 130 is positioned within its paired second bore 108. In one embodiment, the component 128 is a suction plug and the component 130 is a discharge plug. Each of the components 128 and 130 are substantially identical in shape and construction, and each is sized to fully block fluid flow within the respective bore 106, 108. A seal 136 is positioned around the outer surface of each component 128, 130 to block fluid from leaking from the bores 106, 108.

Each of the components 128 and 130 comprises a first section 138 joined to a second section 140. The first section 138 has a footprint sized to cover the bore opening 110 and the second section 140 is configured for removable receipt within one of the bores 106, 108. In one embodiment, the first section 138 is an enlarged plate and the second section 140 is a plug sized to be closely received within one of the bores 106, 108. When the component 128 or 130 is installed within one of the bores 106, 108, the first section 138 engages with the external surface 104 of the body 102. This engagement prevents longitudinal movement of the second section 140 within the bore 106 or 108 as shown in FIG. 3.

With reference to FIG. 1, the first section 138 may be formed as a circular structure having a plurality of notches 142 cut from its outer periphery. When each of the first sections 138 is engaged with the external surface 104 of the body 102, each of the notches 142 partially surrounds one of the openings 144 spaced around each bore opening 110.

Continuing with FIGS. 1 and 3, once each component 128, 130 is installed in the fluid end body 102, each of the components 128, 130 is secured in place by a retainer element 132 in a one-to-one relationship. Each retainer element 132 has a footprint sized to fully cover the first section 138 of the components 128 and 130. The retainer elements 132 shown in FIG. 1 are flat and cylindrical. A plurality of openings 146 are formed about the periphery of each retainer element 132. Each opening 146 is alignable with a corresponding one of the openings 144 in a one-to-one relationship.

Each of the retainer elements 132 is secured to the fluid end body 102 using a fastening system 134. The fastening system comprises a plurality of studs 148, a plurality of washers 150, and a plurality of nuts 152. Each stud 148 is externally threaded adjacent its first end 149, while each opening 144 has internal threads that mate with those of the stud 148. Each stud 148 may be threaded into place within a corresponding one of the openings 144, in a one-to-one relationship.

Once a first stud 148 has been installed in the body 102 at its first end 149, its opposed second end 151 projects from the body's external surface 104. When each component 128 is positioned within its bore 106, each of its notches 142 at least partially surrounds a corresponding one of the studs 148. Likewise, when each component 130 is positioned within its bore 108, each of its notches 142 at least partially surrounds a corresponding one of the studs 148.

Each peripheral opening 146 formed in each of the retainer elements 132 is registerable with a corresponding one of the studs 148. The plurality of washers 150 and nuts 152 may be installed and torqued on each one of the studs 148. The plurality of washers 150 and nuts 152 hold the retainer element 132 against the first section 138 of the components 128, 130 and hold the first section 138 against the external surface 104 of the fluid end body 102. Because each of the retainer elements 132 is attached to the fluid end body 102 using the fastening system 134, no external threads are formed on the outer surface of each retainer element 132. Likewise, no internal threads are formed within the walls of each bore 106, 108.

Figure 2:
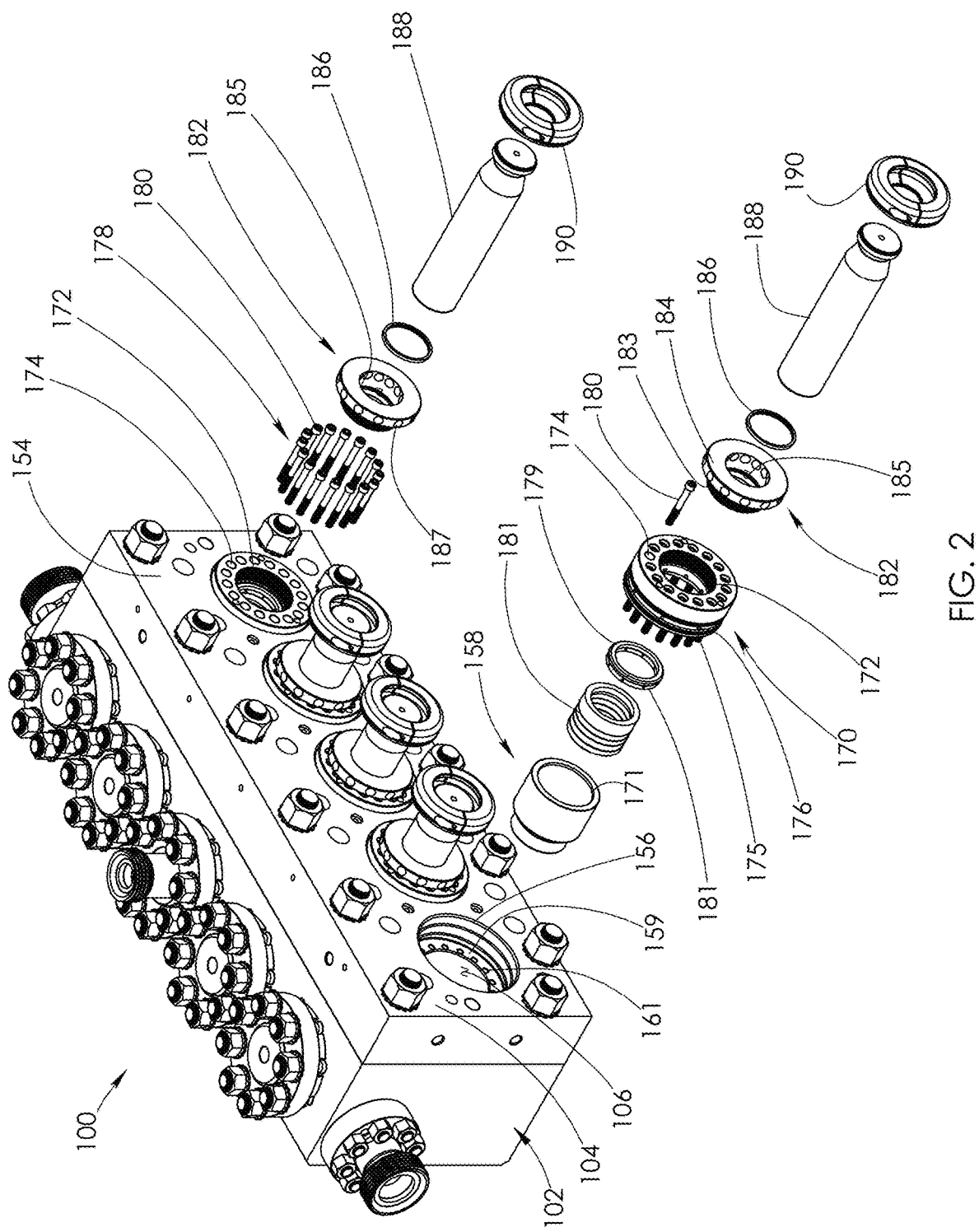
FIG. 2 is a partially exploded view of a plunger end of the fluid end body shown in FIG. 1.

With reference to FIGS. 2 and 3, a plunger end 154 of the fluid end 100 is shown. The plurality of first bores 106 terminate at openings 156 formed on the external surface 104 of the plunger end 154. An internal seat 159 is formed in the walls of each of the bores 106 proximate each of the bore openings 156. A plurality of threaded openings 161 are formed in each of the internal seats 159, as shown in FIG. 2.

A component 158 is positioned within each first bore 106 through each of the openings 156. Each of the components 158 is tubular and sized to be closely received within each bore 106. In one embodiment, the components 158 are stuffing box sleeves.

With reference to FIG. 3, each of the components 158 may have a first section 160 that joins a second section 162 via a tapered section 164. The first section 160 may have a larger diameter than the second section 162. When each of the components 158 are installed within each of the bores 106, the tapered section 164 engages a tapered seat 166 formed in the walls of each bore 106. This engagement prevents longitudinal movement of each component 158 within each bore 106. A seal 167 is positioned around the outer surface of the second section 162 of each of the components 158 in order to block fluid from leaking from the bores 106.

Once installed within the body 102, each component 158 is secured in place by a retainer element 170 in a one-to-one relationship. Each of the retainer elements 170 is sized to be closely received within each bore 106 and engage a top surface 171 of each component 158, as shown in FIG. 3. Each of the retainer elements 170 shown in FIG. 2 has a cylindrical body and a threaded central opening 172. A plurality of openings 174 are formed about the periphery of each of the retainer elements 170. The openings 174 are uniformly spaced around each central opening 172.

A plurality of ports 175 may be formed in an outer surface of each retainer element 170 that are orthogonal to the plurality of openings 174. At least one seal 176 may also be disposed around the outer surface of each of the retainer elements 170. The seal 176 helps block fluid from leaking from the bores 106.

Each of the retainer elements 170 is secured to the fluid end body 102 using a fastening system 178. The fastening system 178 comprises a plurality of threaded screws 180. The screws 180 are preferably socket-headed cap screws.

The fastening system 178 secures each retainer element 170 to each internal seat 159. When each retainer element 170 is positioned within each bore 106, each of the peripheral openings 174 is alignable with a corresponding one of the openings 161 in a one-to-one relationship. Each of the screws 180 is registerable within one of the openings 161 in the seat 159 and one of the peripheral openings 174 in the retainer element 170.

The screws 180 may be torqued as desired to tightly attach each of the retainer elements 170 to each internal seat 159 and securely hold each component 158 within each bore 106. Because each of the retainer elements 170 is attached to the fluid end body 102 using the fastening system 178, no external threads are formed on the outer surface of each of the retainer elements 170. Likewise, no internal threads are formed within the walls of each bore 106 on the plunger end 154 of the body 102.

Continuing with FIGS. 2-3, a plurality of packing seals 181 may be positioned within each of the components 158 and each of the retainer elements 170 to prevent fluid from leaking from the bores 106. At least one of the packing seals 181 may have a plurality of ports 179 formed in its outer periphery, as shown in FIG. 2. The ports 179 provide an exit for fluid trapped within the packing seals 181. Fluid exiting the ports 179 may exit the retainer element 170 through the ports 175.

A packing nut 182 may also be threaded into the central opening 172 of each of the retainer elements 170 in a one-to-one relationship. The packing nut 182 has a threaded section 183 joined to a body 184. The body 184 shown in FIG. 2 is cylindrical. However, the body 184 may also be square or rectangular shaped. A central passage 185 extends through the threaded section 183 and the body 184. The threaded section 183 of the packing nut 182 is threaded into the central opening 172 of the retainer element 170.

When installed within each of the retainer elements 170, each of the packing nuts 182 engages with and compresses the packing seals 181 installed within each component 158 and retainer element 170, as shown in FIG. 3. Compression of the packing seals 181 helps prevent fluid from leaking past the seals 181. A seal 186 may also be positioned within the central passage 185 of each of the packing nuts 182 to further seal fluid from leaking from the bores 106.

A plurality of holes 187 are formed around the outer surface of each of the packing nut bodies 184. The holes 187 serve as connection points for a spanner wrench that may be used to tightly thread the packing nut 182 into the central opening 172 of each of the retainer elements 170.

A plunger 188 may also be installed within each bore 106 in a one-to-one relationship. When a plunger 188 is installed within a bore 106, the plunger 188 is positioned within the component 158, the retainer element 170, and the packing nut 182, as shown in FIG. 3. Each of the plungers 188 projects from the plunger end 154 of the fluid end body 102 and is attached to a separate power end. As discussed above, the power end reciprocates each of the plungers 188 within the fluid end body 102 so as to pump fluid throughout the body. Each of the plungers 188 may be attached to the power end via a clamp 190 in a one-to-one relationship.

Several kits are useful for assembling the fluid end 100. A first kit comprises a plurality of the components 128 or 130, a plurality of the retainer elements 132, and the fastening system 134. A second kit may comprise the plurality of components 158, a plurality of the retainer elements 170, and the fastening system 178. The second kit may further comprise a plurality of the packing seals 181, a plurality of the packing nuts 182, and a plurality of the plungers 188. Each of the kits may be assembled using the fluid end body 102.

Figure 6:
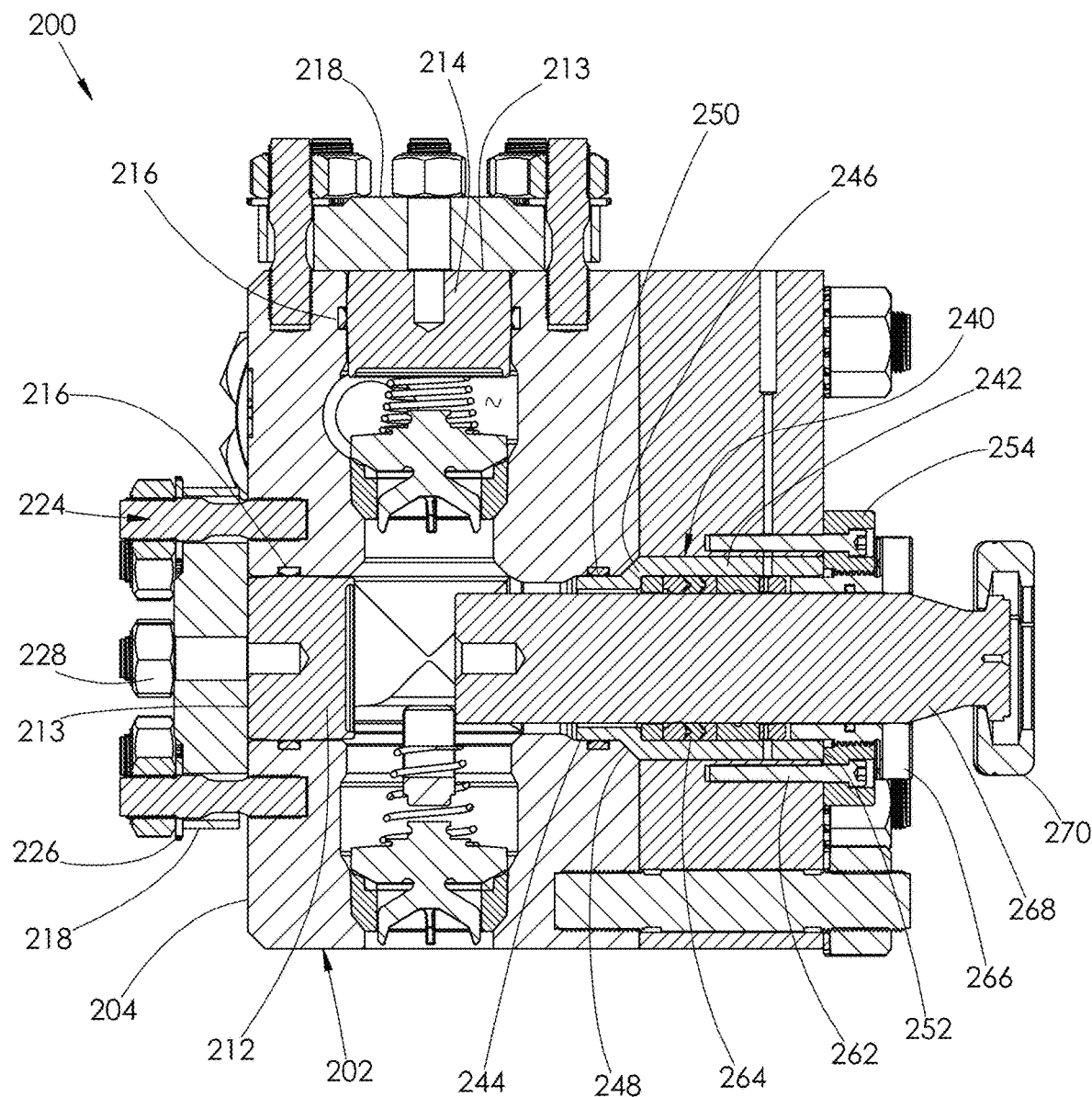
FIG. 6 is a cross-sectional view of the fluid end shown in FIG. 4, taken along line B-B.

With reference to FIGS. 4 and 6, a second embodiment of a fluid end 200 is shown. The fluid end 200 comprises a fluid end body 202 having a flat external surface 204 and a plurality of first and second bores 206, 208 formed adjacent one another therein, as shown in FIG. 4. Each bore of each set of paired bores 206 and 208 terminates in a corresponding opening 210 formed in the external surface 204. A plurality of threaded openings 211 are formed in the body 202 and uniformly spaced around each opening 210. The internal functions of the fluid end 200 are identical to those described with reference to fluid end 100, shown in FIG. 3.

The fluid end 200 further comprises a plurality of sets of components 212 and 214. The number of sets preferably equals the number of set of paired first and second bores 206 and 208 formed in the body 202. The component 212 is positioned within a first bore 206, and the component 214 is positioned within its paired second bore 208. In one embodiment, the component 212 is a suction plug and the component 214 is a discharge plug.

Each of the components 212 and 214 is substantially identical in shape and construction, and is sized to fully block fluid flow within the respective bore 206, 208. A seal 216 is positioned around the outer surface of each component 212, 214 to block fluid from leaking from the bores 206, 208.

As shown in FIG. 4, a top surface 213 of each component 212, 214 may sit flush with the external surface 204 of the body 202 when installed within a respective bore 206, 208. Each of the components 212 and 214 may engage with internal seats (not shown) formed in the walls of each of the bores 206, 208. Such engagement helps prevent longitudinal movement of the components 212, 214 within the respective bore 206, 208.

Once installed within the fluid end body 202, each component 212 and 214 is secured in place by a retainer element 218 in a one-to-one relationship. Each of the retainer elements 218 has a footprint sized to cover a single bore opening 210. The retainer elements 218 shown in FIG. 4 are flat and cylindrical. A plurality of openings 220 are formed about the periphery of each retainer element 218. Each peripheral opening 220 is alignable with a corresponding one of the openings 211 in a one-to-one relationship, as shown in FIG. 4.

The retainer elements 218 are secured to the external surface 204 of the fluid end body 202 by a fastening system 222. The fastening system 222 comprises a plurality of externally threaded studs 224, a plurality of washers 226, and a plurality of internally threaded nuts 228. Each stud 224 is externally threaded adjacent its first end 230, while each opening 211 has internal threads that mate with those of the stud 224. Each stud 224 may be threaded into place within a corresponding one of the openings 211, in a one-to-one relationship.

Once a first stud 224 has been installed in the body 202 at its first end 230, its opposed second end 232 projects from the body's external surface 204. Each peripheral opening 220 formed in the retainer elements 218 is registerable with a corresponding one of the studs 224. The plurality of washers 226 and nuts 228 may be installed and torqued on each of the studs 224. The plurality of washers 226 and nuts 228 hold the retainer elements 218 against the external surface 204 of the fluid end body 202. Because each of the retainer elements 218 is attached to the fluid end body 202 using the fastening system 222, no external threads are formed on the outer surface of each retainer element 218. Likewise, no internal threads are formed within the walls of each bore 206 and 208.

Figure 5:
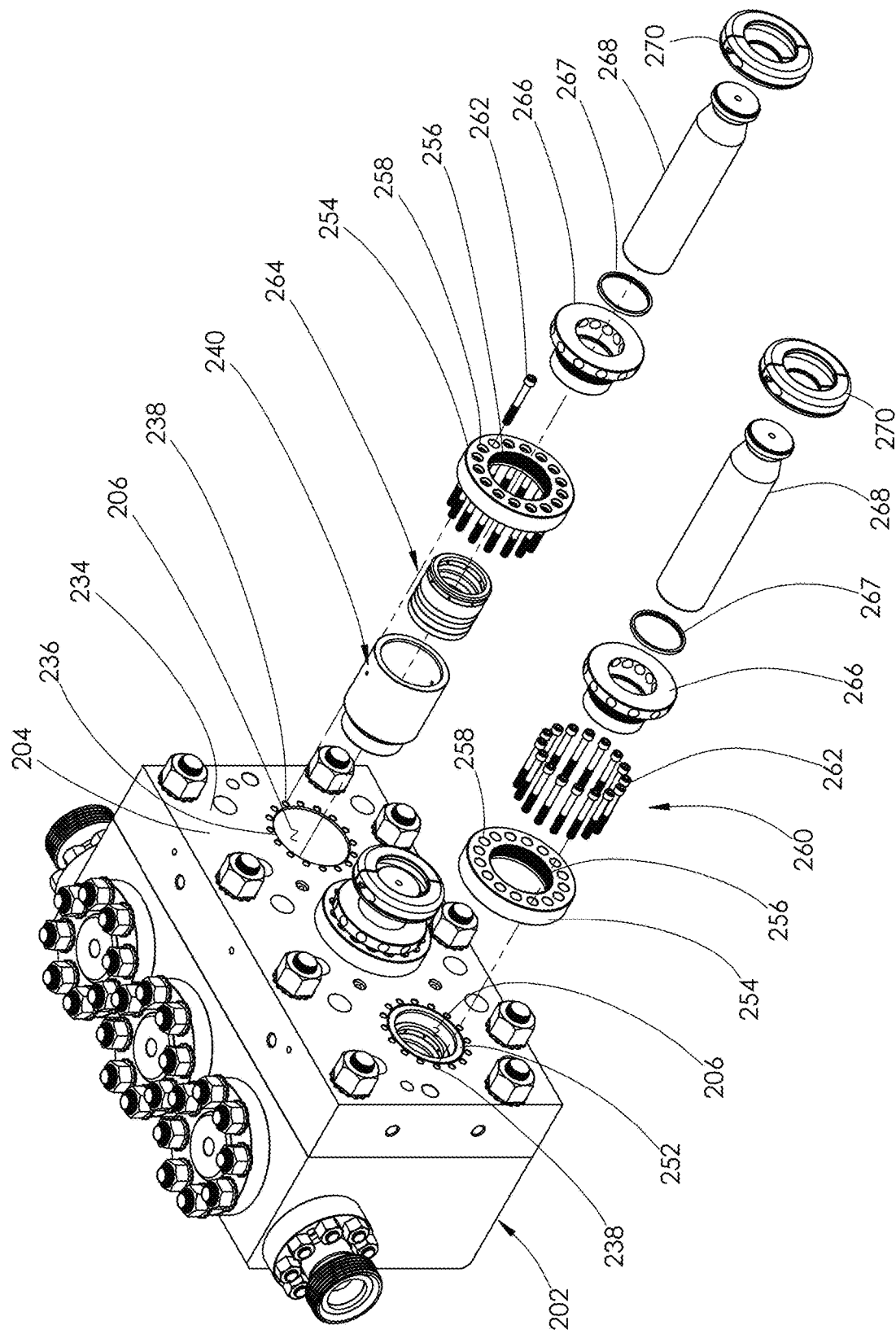
FIG. 5 is a partially exploded view of a plunger end of the fluid end body shown in FIG. 4.

With reference to FIGS. 5-6, a plunger end 234 of the fluid end 200 is shown. The plurality of first bores 206 terminate at openings 236 formed on the external surface 204 of the plunger end 234. The plunger end 234 of the fluid end body 202 is similar to the plunger end 154 of fluid end body 102, shown in FIGS. 2-3, except that an internal seat 159 is not formed within each bore 206. Instead, a plurality of internally threaded openings 238 are formed in the external surface 204 of the fluid end body 202 that are uniformly spaced around each bore opening 236.

A component 240 is positioned within each first bore 206 through each of the openings 236 in a one-to-one relationship. Each of the components 240 is tubular and sized to be closely received within each bore 206. In one embodiment, the components 240 are stuffing box sleeves.

With reference to FIG. 6, each of the components 240 may have a first section 242 that joins a second section 244 via a tapered section 246. The first section 242 may have a larger diameter than the second section 244. When each of the components 240 are installed within each of the bores 206, the tapered section 246 engages a tapered seat 248 formed in the walls of each bore 206. This engagement prevents longitudinal movement of each component 240 within each bore 206. A seal 250 is positioned around the outer surface of the second section 244 of each of the components 240 to block fluid from leaking from the bores 206.

Once installed within the body 202, a top surface 252 of each of the components 240 may sit flush with the external surface 204 of the body 202. Each of the components 240 is secured in place within each bore 206 by a retainer element 254 in a one-to-one relationship. The retainer elements 254 shown in FIG. 5 have a cylindrical body and a threaded central opening 256. A plurality of openings 258 are formed about the periphery of each of the retainer elements 254. The openings 258 are uniformly spaced around each central opening 256.

The retainer elements 254 are secured to the external surface 204 of the fluid end body 202 using a fastening system 260. The fastening system 260 comprises a plurality of threaded screws 262. The screws 262 are preferably socket-headed cap screws. When each retainer element 254 is positioned over each bore opening 236, each of the peripheral openings 258 is alignable with a corresponding one of the openings 238 in a one-to-one relationship. Each of the screws 262 is registerable within one of the openings 238 in the body 202 and one of the peripheral openings 258 in each of the retainer elements 254.

The screws 262 may be torqued as desired to tightly attach each of the retainer elements 254 to the body 202 and securely hold each of the components 240 within each bore 206. Because each of the retainer elements 254 is attached to the fluid end body 202 using the fastening system 260, no external threads are formed on the outer surface of each retainer element 254. Likewise, no internal threads are formed within the walls of each bore 206 on the plunger end 234 of the body 202.

Similar to the plunger end 154 shown in FIG. 2, a plurality of packing seals 264 may be positioned within each of the components 240. A packing nut 266 may thread into the central opening 256 of each retainer element 254 and compress the packing seals 264. A seal 267 may also be positioned within each packing nut 266. Additionally, a plurality of plungers 268 may be disposed within each component 240, retainer element 254, and packing nut 266. Each of the plungers 268 may be attached to a power end via a clamp 270.

In alternative embodiments, the components 212, 214, and 240 may not be flush with the external surface 204 of the body 202 when installed in the respective bores 206, 208. In such case, a flange or ledge may be formed on each of the retainer elements 218 or 254 on its side facing the component 212, 214, or 240. The flange or ledge may be installed within the bores 206, 208 so that it tightly engages the top surface 213 or 252 of the components 212, 214, or 240.

Likewise, if the components 212, 214, or 240 project from the external surface 204 of the body 202 when installed within the respective bores 206, 208, the retainer elements 218 or 254 can be modified to accommodate the component 212, 214, or 240. For example, a cut-out may be formed in the retainer element 218 or 254 for closely receiving the portion of the component 212, 214, or 240 projecting from the body 202. The area of the retainer element 218 or 254 surrounding the cut-out will engage the external surface 204 of the body 202.

Several kits are useful for assembling the fluid end 200. A first kit comprises a plurality of the components 212 or 214, a plurality of retainer elements 218, and the fastening system 222. A second kit may comprise the plurality of components 240, a plurality of the retainer elements 254, and the fastening system 260. The second kit may further comprise a plurality of packing seals 264, a plurality of packing nuts 266, and a plurality of plungers 268. Each of the kits may be assembled using the fluid end body 202.

Figure 7:
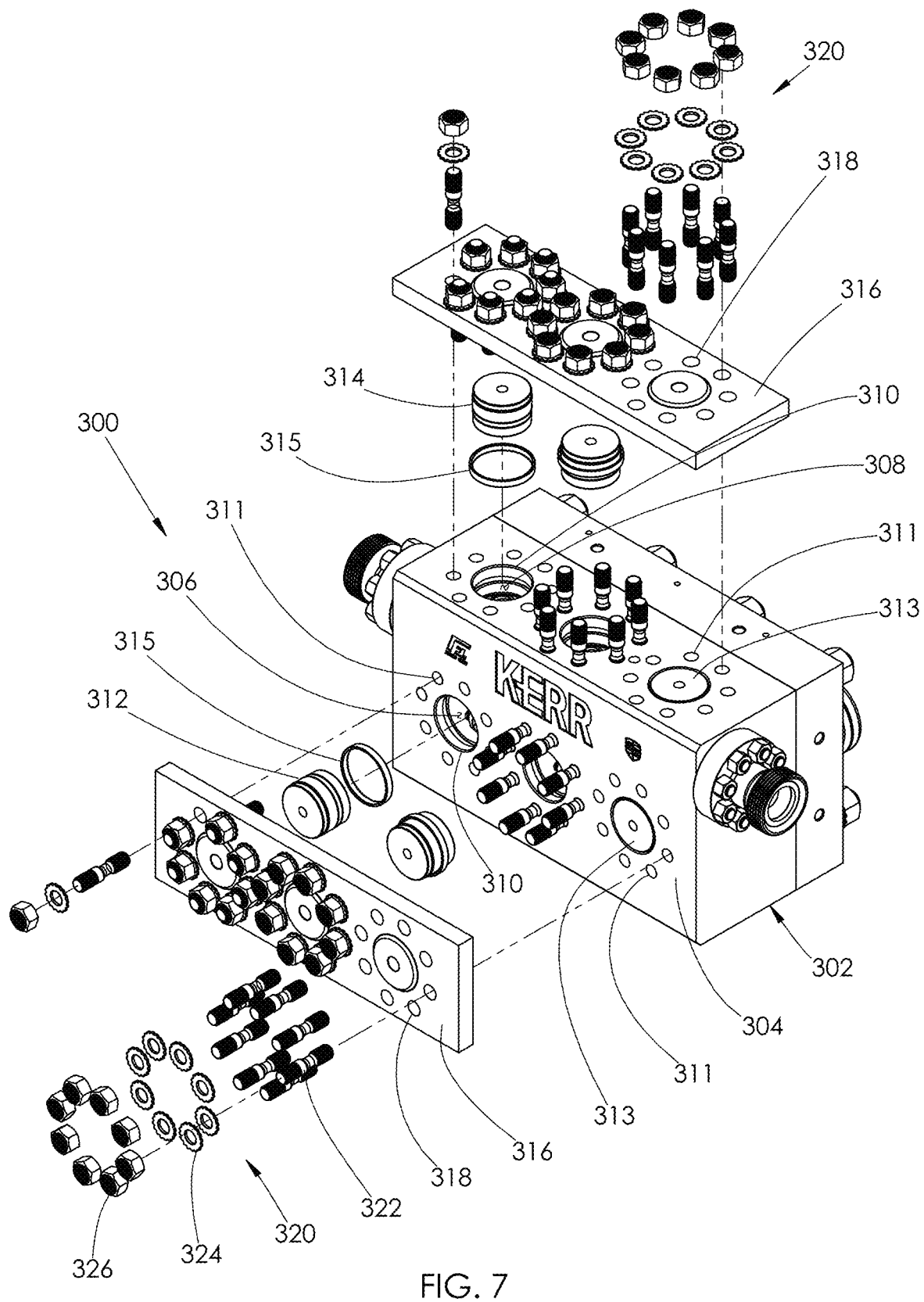
FIG. 7 is a partially exploded view of a third embodiment of a fluid end.

Turning now to FIG. 7, a third embodiment of a fluid end 300 is shown. The fluid end 300 comprises a fluid end body 302 having a flat external surface 304 and a plurality of first and second bores 306, 308 formed adjacent one another therein. Each bore of each set of paired bores 306 and 308 terminates in a corresponding opening 310 formed in the external surface 304. A plurality of threaded openings 311 are formed in the body 302 and uniformly spaced around each bore opening 310. The internal functions of the fluid end 300 are identical to those described with reference to fluid end 100, shown in FIG. 3.

The fluid end 300 further comprises a plurality of sets of components 312 and 314. The number of sets preferably equals the number of set of paired first and second bores 306 and 308 formed in the body 302. The component 312 is positioned within a first bore 306, and the component 314 is positioned within its paired second bore 308. In one embodiment, the component 312 is a suction plug and the component 314 is a discharge plug. A seal 315 is positioned around each of the components 312, 314 to block fluid from leaking from the respective bores 306, 308.

The components 312 and 314 have the same shape and construction as the components 212 and 214 shown in FIGS. 4 and 6. Each of the components 312 and 314 may engage with internal seats (not shown) formed in the walls of each of the bores 306, 308. Such engagement helps prevent longitudinal movement of the components 312, 314 within the respective bores 306, 308.

Once installed within the body 302, a top surface 313 of each of the components 312, 314 may sit flush with the external surface 304 of the body 302. Each of the components 312, 314 is secured within each respective bore 306, 308 by a retainer element 316. Each of the retainer elements 316 shown in FIG. 7 is a large rectangular plate having a footprint sized to cover a plurality of adjacent bore openings 310 at one time. A plurality of openings 318 are formed in each retainer element 316 that are alignable with a corresponding one of the openings 311 in a one-to-one relationship.

Each of the retainer elements 316 is secured to the external surface 304 of the fluid end body 302 by a fastening system 320. The fastening system 320 comprises a plurality of externally threaded studs 322, a plurality of washers 324, and a plurality of internally threaded nuts 326. The fastening system 320 secures each of the retainer elements 316 on the fluid end body 302 in the same way as described with reference to the fastening system 222 used with the fluid end 200.

Because each of the retainer elements 316 is attached to the fluid end body 302 using the fastening system 320, no external threads are formed in the retainer element 316. Likewise, no internal threads are formed within the walls of each bore 306 and 308.

When the retainer elements 316 are installed on the fluid end body 302, the edges of the retainer element 316 may extend far enough so as to sit flush with the edges of the fluid end body 302. In alternative embodiments, the retainer element 316 may have different shapes or sizes. For example, the retainer element 316 may be large enough so as to cover an entire side surface of the fluid end body 302. Alternatively, the retainer elements 316 may have rounded edges, as shown in FIG. 8.

Figure 8:
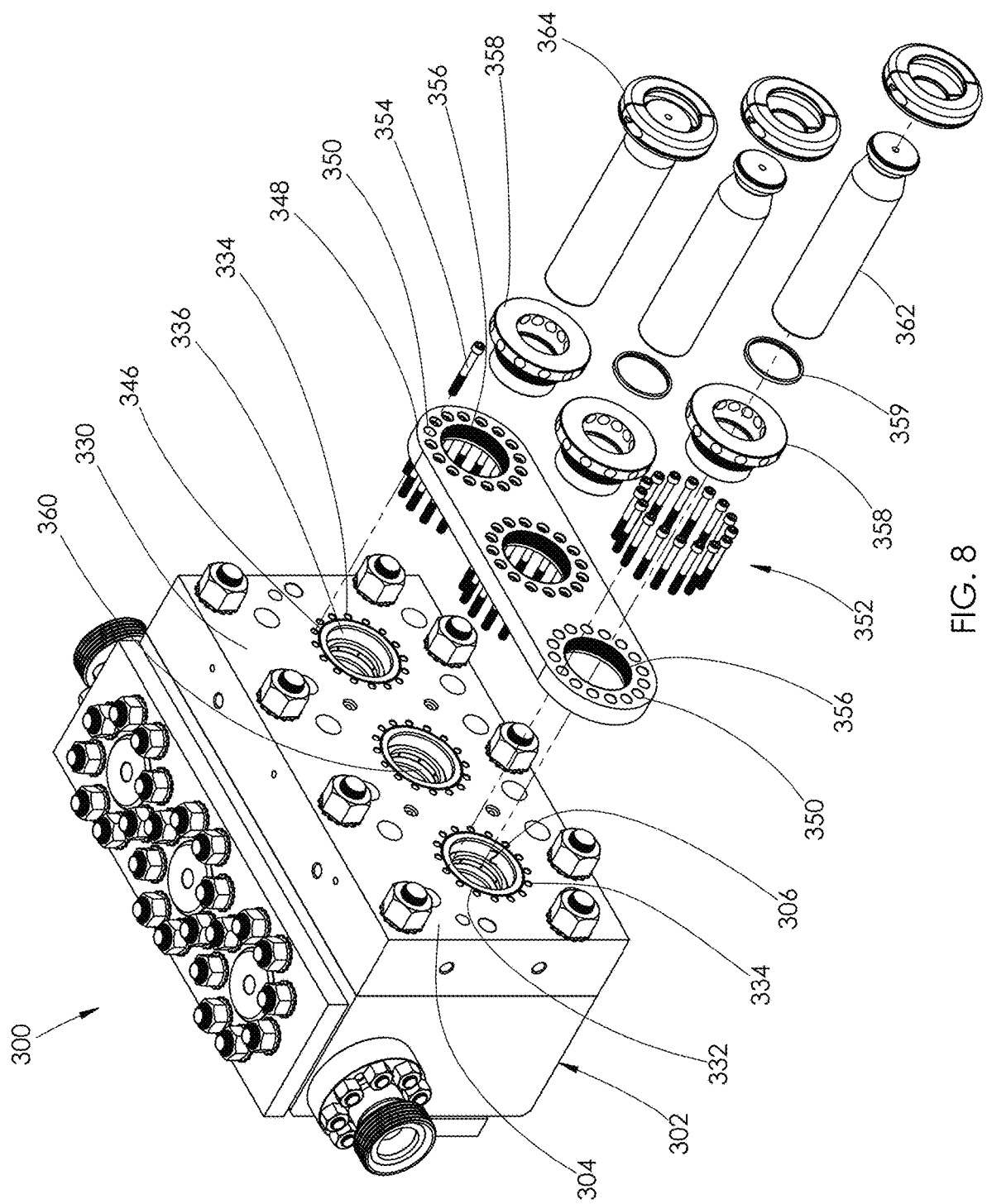
FIG. 8 is a partially exploded view of a plunger end of the fluid end body shown in FIG. 7.

Turning to FIG. 8, a plunger end 330 of the fluid end 300 is shown. The plurality of first bores 306 terminate at openings 332 formed on the external surface 304 of the plunger end 330. A plurality of internally threaded openings 334 are formed in the external surface 304 that are uniformly spaced around each bore opening 332.

A component 336 is positioned within each first bore 306 through each of the openings 332. Each of the components 336 is tubular and sized to be closely received within each bore 306. In one embodiment, the components 336 are stuffing box sleeves. The components 336 have the same shape and construction as the components 240, shown in FIGS. 5-6.

Once installed within the body 302, a top surface 346 of each of the components 336 may sit flush with the external surface 304 of the body 302. Each of the components 336 is secured within each bore 306 by a single retainer element 348. The retainer element 348 shown in FIG. 8 is a large oval plate having a footprint sized to cover a plurality of adjacent bore openings 332 formed on the plunger end 330 of the fluid end body 302. A plurality of openings 350 are formed in the retainer element 348 that are alignable with a corresponding one of the openings 334 in a one-to-one relationship.

In alternative embodiments, the retainer element 348 may have different shapes or sizes. For example, the retainer element 348 may be large enough so as to cover an entire side surface of the fluid end body 302. Alternatively, the retainer element 348 may have squared edges, as shown in FIG. 7.

The retainer element 348 is secured to the external surface 304 of the fluid end body 302 by a fastening system 352. The fastening system 352 comprises a plurality of screws 354. The fastening system 352 secures the retainer element 348 on the fluid end body 302 in the same way as described with reference to the fastening system 260 used with the fluid end 200 and shown in FIGS. 5-6.

Because the retainer element 348 is attached to the fluid end body 302 using the fastening system 352, no external threads are formed in the retainer element 348. Likewise, no internal threads are formed within the walls of each bore 306.

A central threaded opening 356 is formed in the center of each grouping of openings 350 in the retainer element 348. The openings 356 are alignable with each bore opening 332 in a one-to-one relationship. A single packing nut 358 may thread into each central opening 356. A seal 359 may be positioned within each packing nut 358.

Similar to the plunger end 234 shown in FIGS. 5-6, a plurality of packing seals 360 may be positioned within each component 336. Each of the packing nuts 358 may compress the packing seals 360 when installed within the retainer element 348. A plurality of plungers 362 may be disposed within each component 336, the retainer element 348, and each packing nut 358. Each of the plungers 362 may be connected to a power end via a clamp 364. A cross-sectional view of the fluid end 300 looks identical to the cross-sectional view of the fluid end 200, shown in FIG. 6.

Several kits are useful for assembling the fluid end 300. A first kit comprises a plurality of the components 312 or 314, a retainer element 316, and the fastening system 320. A second kit may comprise a plurality of the components 336, a retainer element 348, and the fastening system 352. The second kit may further comprise a plurality of the packing seals 360, a plurality of the packing nuts 358, and a plurality of the plungers 362. Each of the kits may be assembled using the fluid end body 302.

Figure 9:
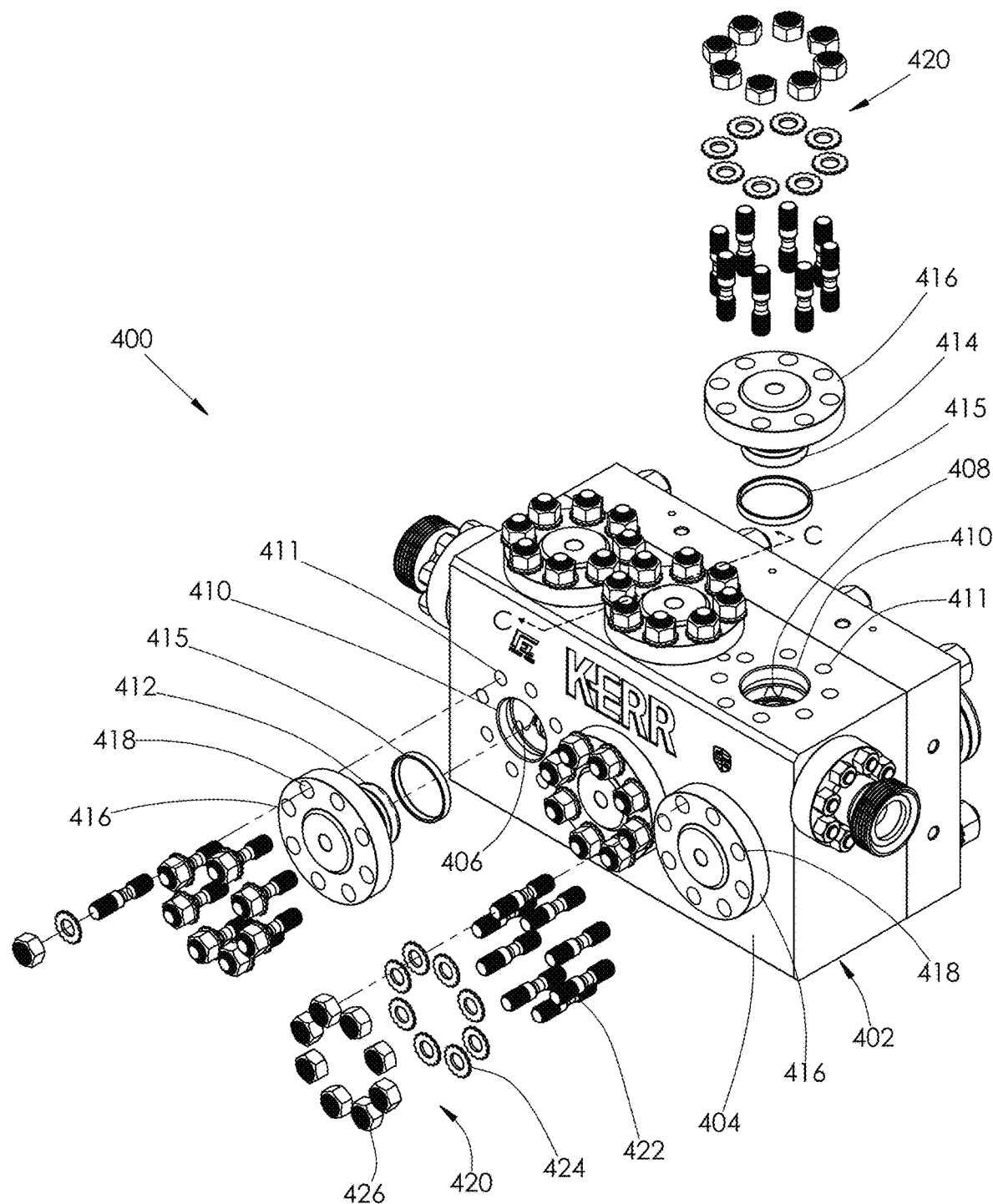
FIG. 9 is a partially exploded view of a fifth embodiment of a fluid end.
Figure 11:
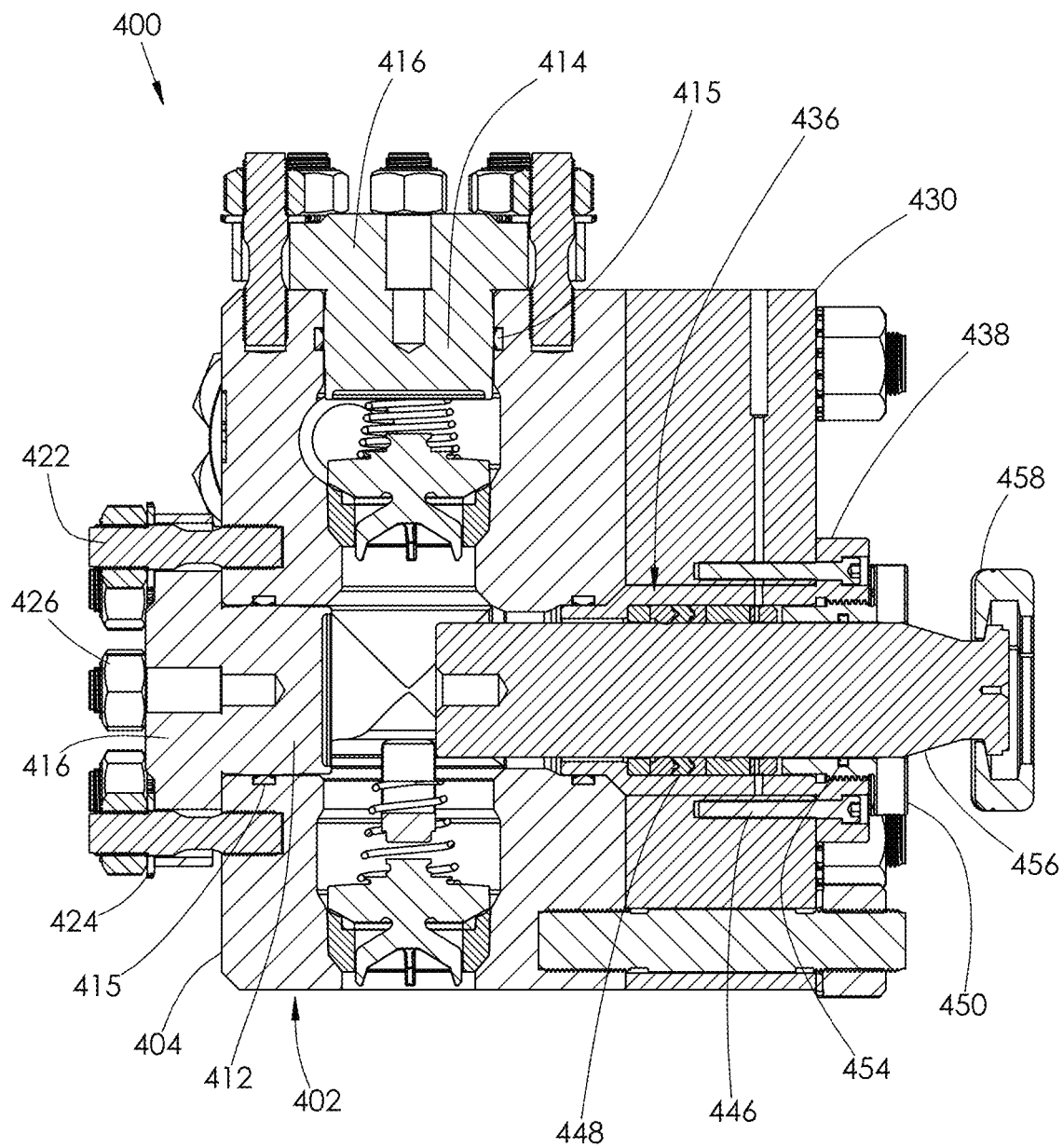
FIG. 11 is a cross-sectional view of the fluid end shown in FIG. 9, taken along line C-C.

With reference to FIGS. 9 and 11, a fourth embodiment of a fluid end 400 is shown. The fluid end 400 comprises a fluid end body 402 having a flat external surface 404 and a plurality of first and second bores 406, 408 formed adjacent one another therein, as shown in FIG. 9. Each bore of each set of paired bores 406 and 408 terminates in a corresponding opening 410 formed in the external surface 404. A plurality of threaded openings 411 are formed in the body 402 and uniformly spaced around each opening 410. The internal functions of the fluid end 400 are identical to those described with reference to fluid end 100, shown in FIG. 3.

The fluid end 400 further comprises a plurality of sets of components 412 and 414. The number of sets preferably equals the number of set of paired first and second bores 406 and 408 formed in the body 402. The component 412 is positioned within a first bore 406, and the component 414 is positioned within its paired second bore 408. In one embodiment, the component 412 is a suction plug and the component 414 is a discharge plug. A seal 415 is positioned around the outer surface of each of the components 412, 414 to block fluid from leaking from the respective bores 406, 408.

The components 412 and 414 have substantially the same shape and construction as the components 212 and 214 shown in FIGS. 4 and 6. However, in contrast to the components 212, 214, each of the components 412 and 414 is joined to a single retainer element 416.

The components 412, 414 may be welded or fastened to the center of the back surface of each retainer element 416. Alternatively, each of the components 412 or 414 and a corresponding retainer element 416 may be machined as a single piece, as shown in FIG. 11. Each of the retainer elements 416 secures each of the components 412, 414 within the respective bores 406, 408. The retainer elements 416 also prevent the components 412, 414 from moving longitudinally within the respective bores 406, 408.

A plurality of openings 418 are formed about the periphery of each retainer element 416. Each peripheral opening 418 is alignable with a corresponding one of the openings 411 in a one-to-one relationship, as shown in FIG. 9.

The retainer elements 416 are secured to the external surface 404 of the body 402 using a fastening system 420. The fastening system 420 comprises a plurality of externally threaded studs 422, a plurality of washers 424, and a plurality of internally threaded nuts 426. The fastening system 420 secures the retainer elements 416 to the fluid end body 402 in the same way as described with reference to the fastening system 222 used with the fluid end 200.

Because the retainer elements 416 are attached to the fluid end body 402 using the fastening system 420, no external threads are formed in the retainer elements 416. Likewise, no internal threads are formed within the walls of each bore 406 and 408.

Figure 10:
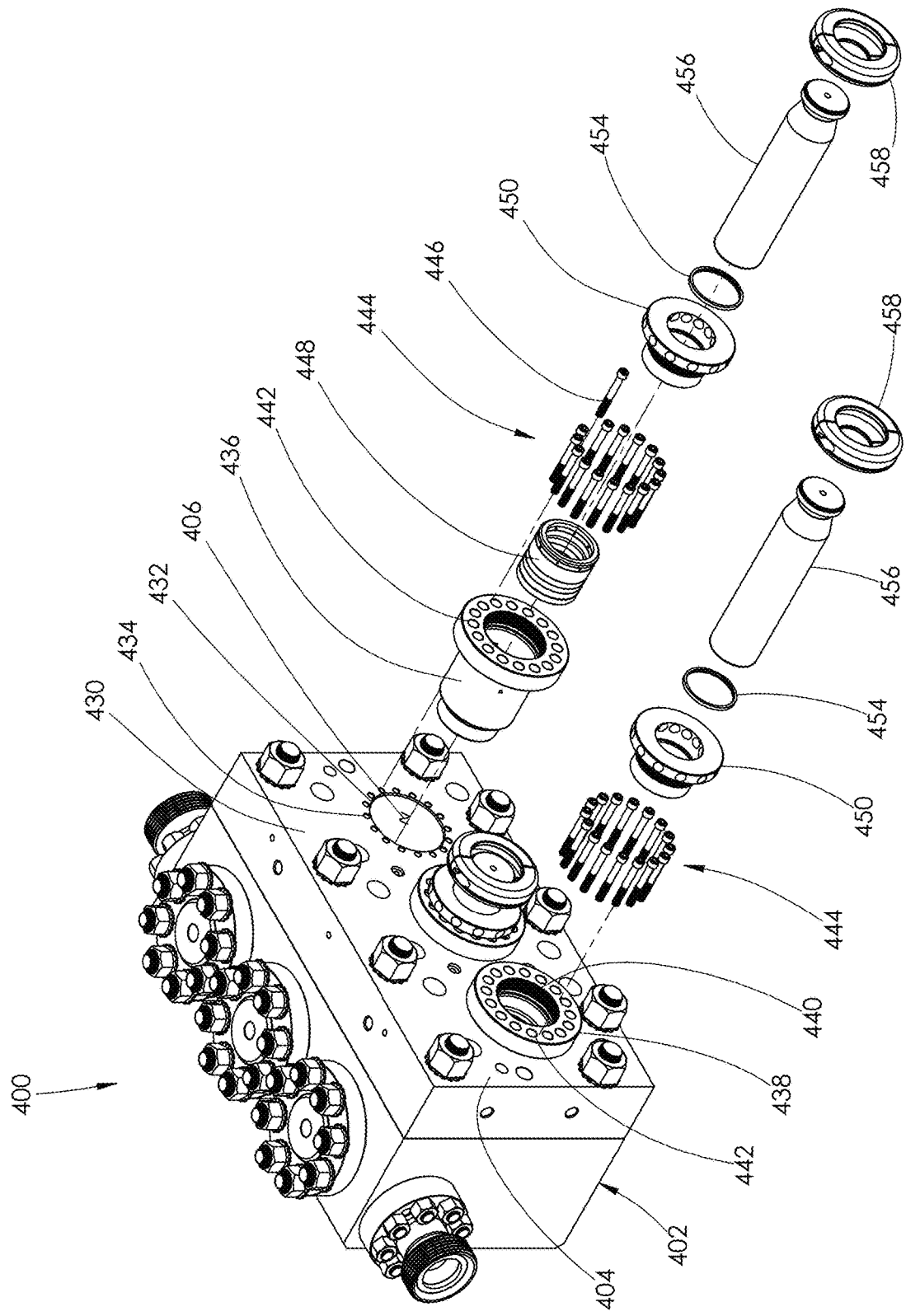
FIG. 10 is a partially exploded view of a plunger end of the fluid end body shown in FIG. 9.

Turning now to FIGS. 10-11, a plunger end 430 of the fluid end 400 is shown. The plurality of first bores 406 terminate at openings 432 formed on the external surface 404 of the plunger end 430. A plurality of internally threaded openings 434 are formed in the external surface 404 that are uniformly spaced around each bore opening 432.

A component 436 is positioned within each first bore 406 through each of the openings 432. Each of the components 436 is tubular and sized to be closely received within each bore 406. In one embodiment, the components 436 are stuffing box sleeves. The components 436 have substantially the same shape and construction as the components 240, shown in FIGS. 5-6. However, in contrast to the components 240, each of the components 436 is joined to a single retainer element 438.

The components 436 may be welded or fastened to the center of the back surface of each retainer element 438. Alternatively, each of the components 436 and a corresponding retainer element 438 may be machined as a single piece, as shown in FIG. 11. Each of the retainer elements 438 secures each of the components 436 within the bores 406. The retainer elements 438 also prevent the components 436 from moving longitudinally within the bores 406.

A threaded central opening 440 is formed within each retainer element 438. A plurality of threaded openings 442 are formed about the periphery of each of the retainer elements 438 and are uniformly spaced around each central opening 440. Each peripheral opening 442 is alignable with a corresponding one of the openings 434 in a one-to-one relationship, as shown in FIG. 10.

The retainer elements 438 are secured to the external surface 404 of the body 402 using a fastening system 444. The fastening system 444 comprises a plurality of screws 446. The fastening system 444 secures the retainer elements 438 to the fluid end body 402 in the same way as described with reference to the fastening system 260 used with the fluid end 200 and shown in FIGS. 5-6.

Because the retainer elements 438 are attached to the fluid end body 402 using the fastening system 444, no external threads are formed in the retainer elements 416. Likewise, no internal threads are formed within the walls of each bore 406 on the plunger end 430 of the body 402.

Like the plunger end 330 of fluid end 300, the fluid end 400 may also comprise a plurality of packing seals 448, a plurality of packing nuts 450, each housing a seal 454, and a plurality of plungers 456. Each plunger 456 may be connected to a power end via a clamp 458.

Several kits are useful for assembling the fluid end 400. A first kit comprises a plurality of the components 412 or 414, a plurality of the retainer elements 416, and the fastening system 420. A second kit may comprise a plurality of the components 436, a plurality of the retainer elements 438, and the fastening system 444. The second kit may further comprise a plurality of the packing seals 448, a plurality of the packing nuts 450 and a plurality of the plungers 456. Each of the kits may be assembled using the fluid end body 402.

Figure 12:
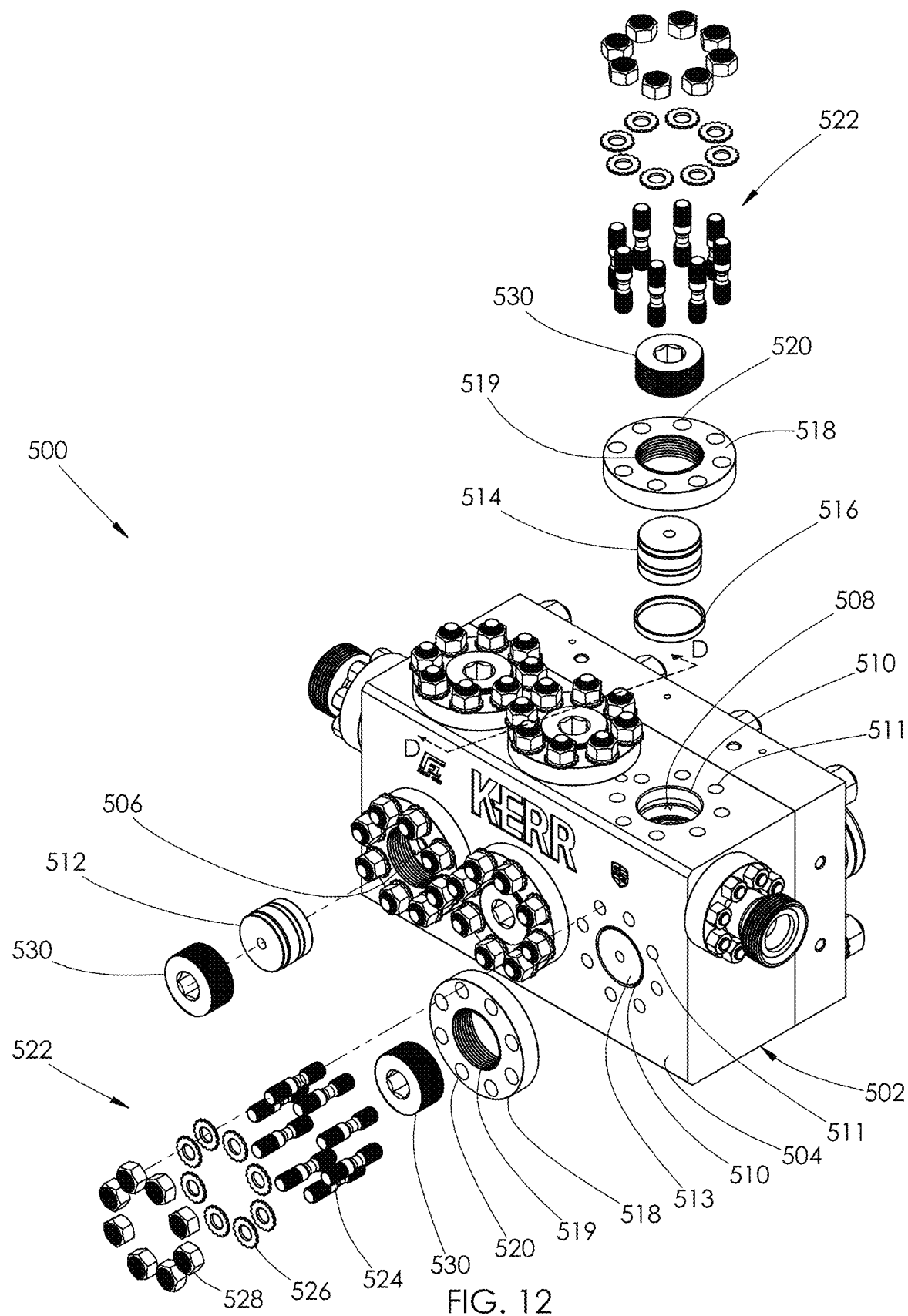
FIG. 12 is a partially exploded view of a sixth embodiment of a fluid end.
Figure 13:
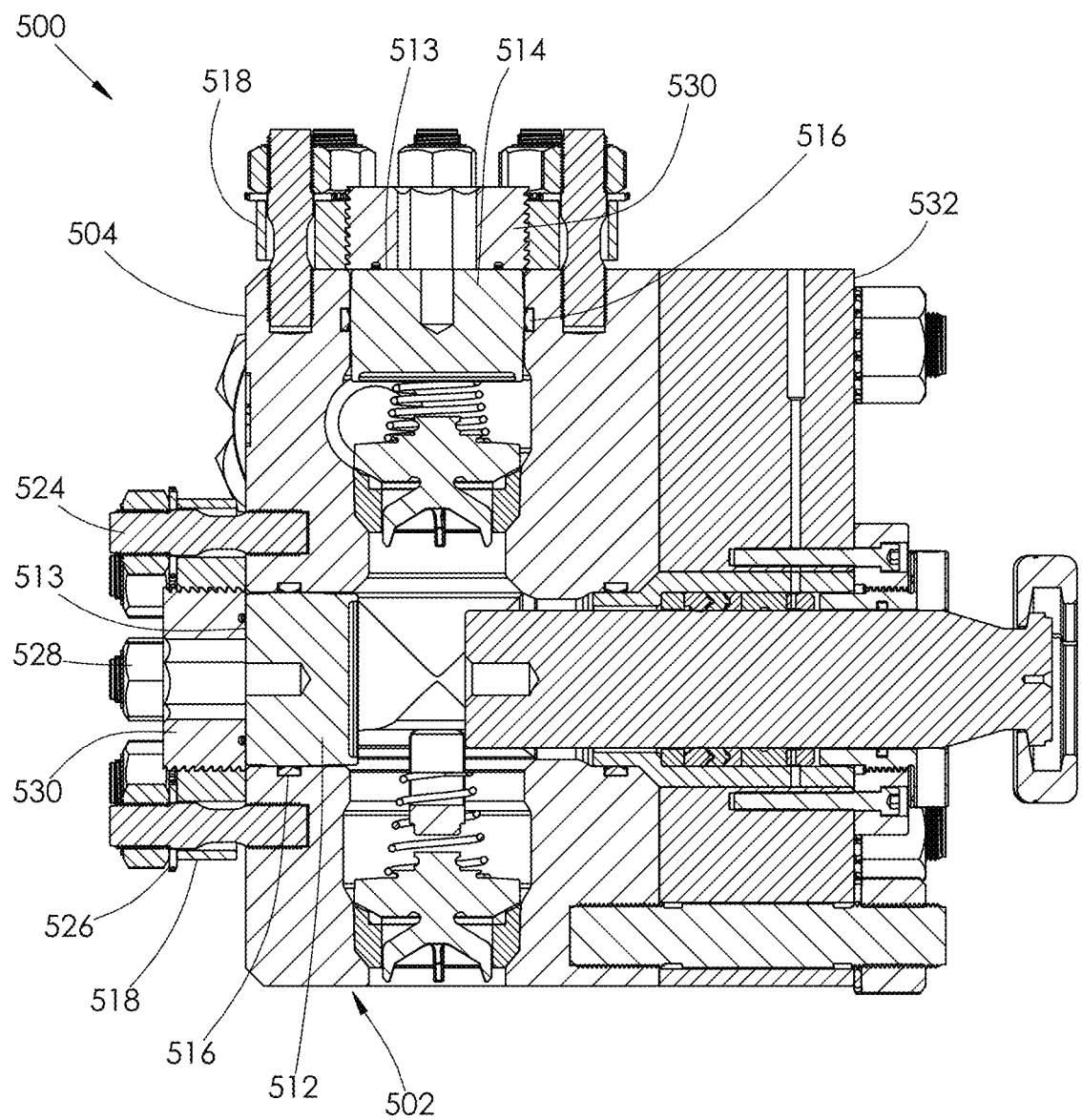
FIG. 13 is a cross-sectional view of the fluid end shown in FIG. 12, taken along line D-D.

With reference to FIGS. 12-13, a fifth embodiment of a fluid end 500 is shown. The fluid end 500 comprises a fluid end body 502 having a flat external surface 504 and a plurality of first and second bores 506, 508 formed adjacent one another therein, as shown in FIG. 12. Each bore of each set of paired bores 506 and 508 terminates in a corresponding opening 510 formed in the external surface 504. A plurality of threaded openings 511 are formed in the body 502 and uniformly spaced around each opening 510. The internal functions of the fluid end 500 are identical to those described with reference to fluid end 100, shown in FIG. 3.

The fluid end 500 further comprises a plurality of sets of components 512 and 514. The number of sets preferably equals the number of set of paired first and second bores 506 and 508 formed in the body 502. The component 512 is positioned within a first bore 506, and the component 514 is positioned within its paired second bore 508. In one embodiment, the component 512 is a suction plug and the component 514 is a discharge plug. The components 512 and 514 have the same shape and construction as the components 212 and 214 shown in FIGS. 4 and 6. A seal 516 is positioned around the outer surface of each component 512, 514 to block fluid from leaking from the bores 506, 508.

As shown in FIG. 12, a top surface 513 of each of the components 512, 514 may sit flush with the external surface 504 of the body 502 when installed within a respective bore 506, 508. Each of the components 512 and 514 may engage with internal seats (not shown) formed in the walls of each of the bores 506, 508. Such engagement helps prevent longitudinal movement of the components 512, 514 within the respective bore 506, 508.

Once installed within the fluid end body 502, each component 512 and 514 is secured in place by a retainer element 518 in a one-to-one relationship. Each of the retainer elements 518 has a footprint sized to cover a single bore opening 510. The retainer elements 518 shown in FIG. 12 are flat and cylindrical and each have a central threaded opening 519. A plurality of openings 520 are formed about the periphery of each retainer element 518 and are uniformly spaced around each central opening 519. Each peripheral opening 520 is alignable with a corresponding one of the openings 511 in a one-to-one relationship, as shown in FIG. 12.

The retainer elements 518 are secured to the external surface 504 of the fluid end body 502 by a fastening system 522. The fastening system 522 comprises a plurality of externally threaded studs 524, a plurality of washers 526, and a plurality of internally threaded nuts 528. The fastening system 522 secures the retainer elements 518 to the fluid end body 502 in the same way as described with reference to the fastening system 222 used with the fluid end 200 shown in FIGS. 4 and 6.

Each central opening 519 formed in each retainer element 518 is alignable with each corresponding bore opening 510 in a one-to-one relationship. A retaining nut 530 may thread into each central opening 519 to cover each bore opening 510. Using a threaded retaining nut 530 with the retainer element 518 allows access to each bore opening 510 without having to remove the retainer elements 518 from the fluid end body 502.

While the fluid end 500 uses a threaded retaining nut 530, the retaining nut 530 is not threaded into the walls of the bores 506, 508. Thus, any failures associated with the retaining nut 530 may be experienced in the retainer element 518, which is easily replaceable. This similar configuration is used on the plunger end 234 of the fluid end 200 shown in FIGS. 5-6. Such configuration is shown again on a plunger end 532 of the fluid end body 502 in FIG. 13.

A kit is useful for assembling the fluid end 500. The kit may comprise a plurality of the components 512 or 514, a plurality of the retainer elements 518, and the fastening system 522. The kit may further comprise a plurality of retaining nuts 530. The kit may be assembled using the fluid end body 502.

Figure 14:
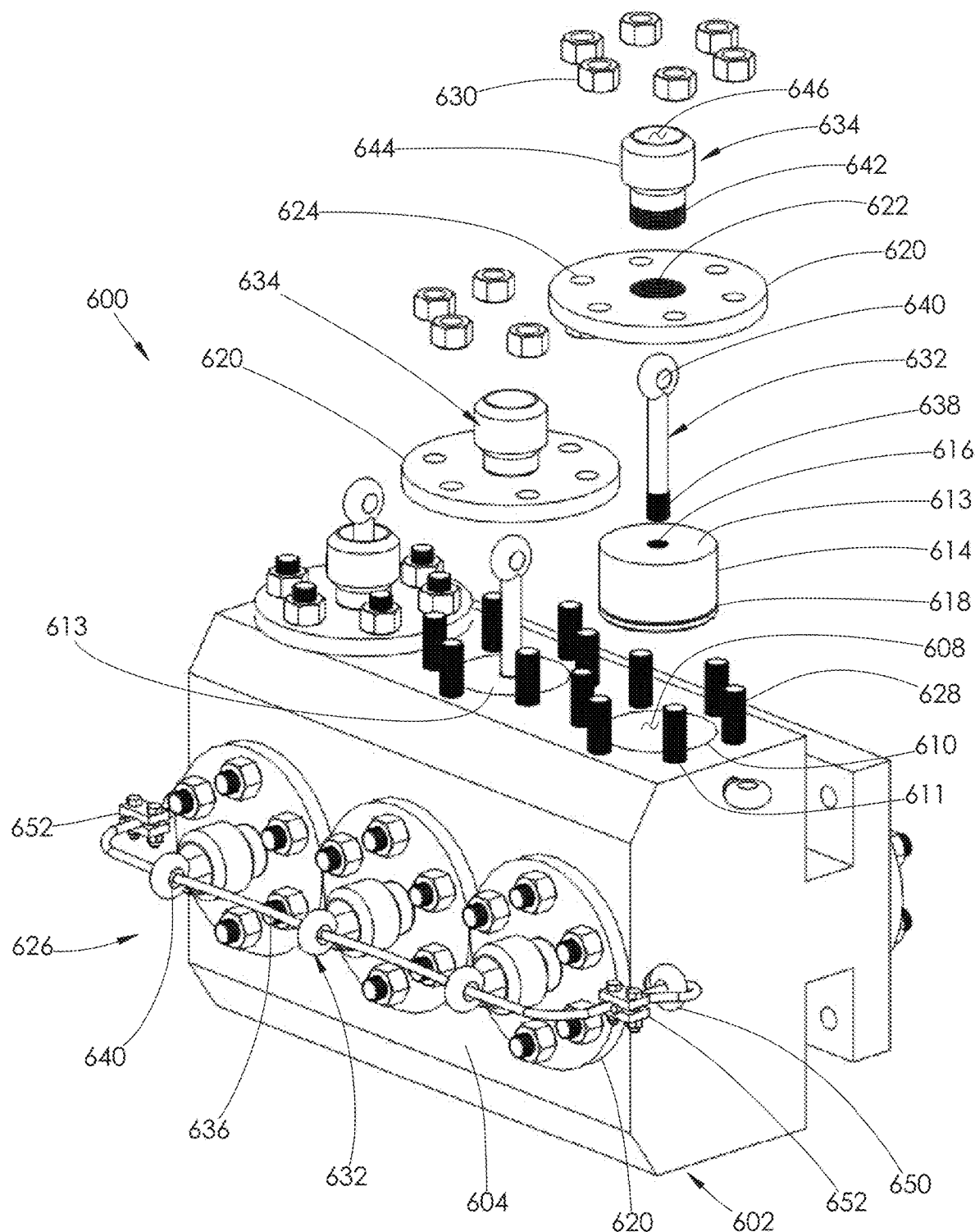
FIG. 14 is a partially exploded view of a seventh embodiment of a fluid end.

Turning now to FIG. 14, a sixth embodiment of a fluid end 600 is shown. The fluid end 600 comprises a fluid end body 602 having a flat external surface 604 and a plurality of first bores (not shown) and second bores 608 formed adjacent one another therein. Each bore of each set of paired bores terminates in a corresponding opening 610 formed in the external surface 604. A plurality of threaded openings 611 are formed in the body 602 and uniformly spaced around each opening 610. The internal functions of the fluid end 600 are identical to those described with reference to fluid end 100, shown in FIG. 3.

The fluid end 600 further comprises a plurality of sets of components 614. The component 614 is positioned within a second bore 608. The components positioned within each first bore are not shown in FIG. 14. However, such components are identical in shape and construction to the components 614.

The number of sets of components preferably equals the number of sets of paired first bores (not shown) and second bores 608 formed in the body 602. In one embodiment, the component 614 positioned within a first bore is a suction plug, and the component 614 positioned within its paired second bore 608 is a discharge plug. The components 614 have a substantially similar shape and construction as the components 212 and 214 shown in FIGS. 4 and 6, except that a threaded hole 616 is formed in a top surface 613 of each component 614. A seal 618 is positioned around the outer surface of each component 614 to block fluid from leaking from the bores 608.

The top surface 613 of each component 614 may sit flush with the external surface 604 of the body 602 when installed within a bore 608. Each of the components 614 may engage with internal seats (not shown) formed in the walls of each of the bores 608. This engagement helps prevent longitudinal movement of the components 614 within the bore 608. Likewise, the components positioned within the first bores (not shown) may engage internal seats formed within the walls of the first bores.

Once installed within the fluid end body 602, each component 614 is secured by a retainer element 620 in a one-to-one relationship. Likewise, the components positioned within the first bores (not shown) are each secured by one of the retainer elements 620. Each of the retainer elements 620 has a footprint sized to cover a single bore opening 610. The retainer elements 620 shown in FIG. 14 are flat and cylindrical and each have a central threaded opening 622. A plurality of openings 624 are formed about the periphery of each retainer element 620 and are uniformly spaced around each central opening 622. Each peripheral opening 624 is alignable with a corresponding one of the openings 611 in a one-to-one relationship.

The retainer elements 620 are secured to the external surface 604 of the fluid end body 602 by a fastening system 626. The fastening system 626 comprises a plurality of externally threaded studs 628, a plurality of washers (not shown), and a plurality of internally threaded nuts 630. The fastening system 626 secures the retainer elements 620 to the fluid end body 602 in the same way as described with reference to the fastening system 222 used with the fluid end 200 shown in FIGS. 4 and 6.

The fastening system 626 may further comprise a plurality of eye bolts 632, a plurality of handles 634, and a cable 636. Each eye bolt 632 has external threads 638 formed on its first end and an eye 640 formed on its opposite second end. The threaded end 638 of each eye bolt 632 threads into each hole 616 formed in each component 614 in a one-to-one relationship. Once installed within each hole 616, the eye 640 of each eyebolt 632 projects through the central opening 622 formed in each retainer element 620.

Each of the handles 634 has a threaded section 642 joined to a cylindrical body 644. A central passage 646 extends through the threaded section 642 and the body 644. Each of the threaded sections 642 may be installed within the central opening 622 of each of the retainer elements 620 such that each eye bolt 632 is disposed within the central passage 646. Once one of the handles 634 is installed in a retainer element 620, the eye bolt 632 projects from the handle 634. The handle 634 helps support the eye bolt 632 and provides a grip to assist in installation or removal of a retainer element 620 on the fluid end body 602.

The cable 636 may be disposed through each eye 640 of each eye bolt 632. Each of the eye bolts 632 may be oriented to facilitate the passage of the cable 636 through each eye 640. The ends of the cable 636 may be attached to the external surface 604 of the fluid end body 602 using eye bolts 650 and clamps 652. The cable 636 is preferably made of a stiff and tough material, such as high-strength nylon or steel.

In operation, the eyebolts 632 and cable 636 tether each of the retaining elements 620 and components 614, in case of failure of the retainer elements 620, a portion of the fastening system 626, or the fluid end body 602. When a failure occurs, the large pressure in the fluid end body 602 will tend to force the components 614 out of their respective bores 608 with a large amount of energy. The cable 636 helps to retain the components 614 within the bores 608 in the event of a failure. The cable 636 also helps to retain the retainer elements 620 in position in the event of a failure. The fastening systems 134, 222, 320, 420, and 522 used with fluid ends 100, 200, 300, 400, and 500 may also be configured for use with the eye bolts 632, handles 634 and cable 636.

In alternative embodiments, the handles 634 may not be used. A single eye bolt 632 may also be formed integral with a single component 614. A single cable 636 may also be used through each of the eyebolts 632. Each cable 636 would independently attach to the external surface 604 of the fluid end body 602.

Several kits are useful for assembling the fluid end 600. A first kit comprises a plurality of the components 614, a plurality of the retainer elements 620, and the fastening system 626. The kit may be assembled using the fluid end body 602.

With reference to FIGS. 1-14, a single fluid end body may use any combination of the kits described herein. The fluid end bodies, components, and retainer elements described herein are preferably made of high strength steel.

While the fluid end bodies 102, 202, 302, 402, and 502 shown in FIGS. 1-13 are substantially rectangular in shape, the kits described herein may also be used with any shape of a fluid end body, such as that shown in FIG. 14. Likewise, the retainer elements described herein may vary in shape and size, as desired. For example, the circular retainer elements described herein may be square or rectangular shaped.

The fastening systems 134, 222, 320, 420, and 522 described herein each use eight studs around each bore opening. In alternative embodiments, more than eight studs or less than eight studs may be used to secure each retainer element over each bore opening. For example, FIG. 14 only shows six studs securing each retainer element 620 over each bore opening 610. Likewise, fewer than 16 or more than 16 screws may be used with the fastening systems 178, 260, 352, and 444. The number of peripheral openings formed in each retainer element described herein may correspond with the number of openings formed around each bore opening in each fluid end body and the number of studs or screws being used.

The fastening systems described herein reduce the amount of torque required to secure each retainer element to the fluid end bodies. Rather than having to torque one large retaining nut, the torque is distributed throughout the plurality of studs, nuts, or screws. Decreasing the amount of torque required to seal the bores increases the safety of the assembly process.

Figure 15:
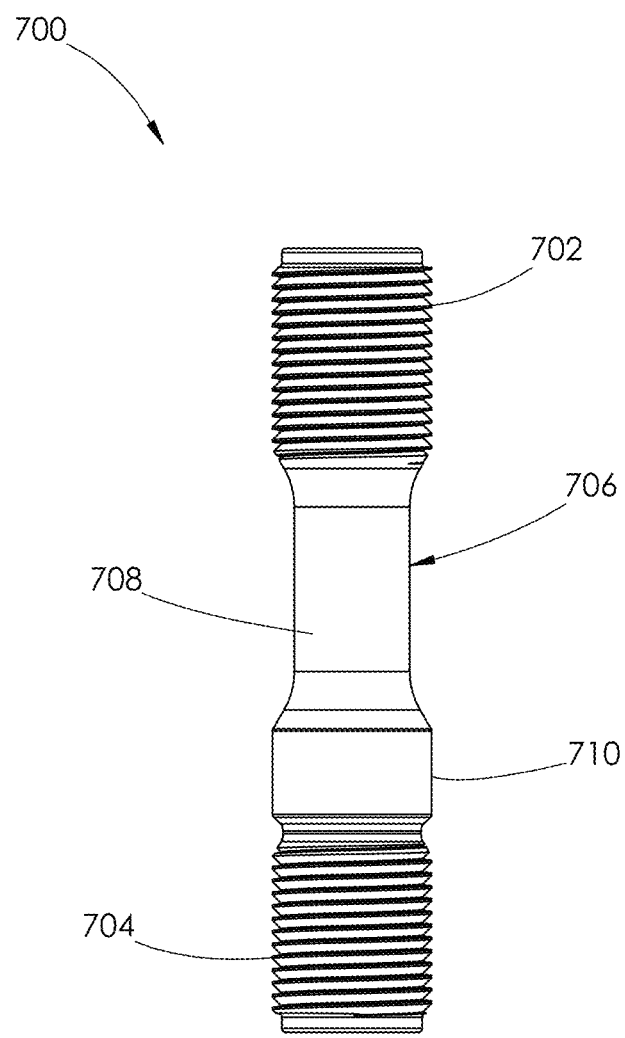
FIG. 15 is a side elevational view of one of the plurality of studs for use with the fluid ends.

Turning to FIG. 15, a stud 700 is shown. The stud 700 may be used with the fastening systems 134, 222, 320, 420, 522, and 626 shown in FIGS. 1, 4, 7, 9, 11, and 14. For exemplary purposes, the stud 700 will be described with reference to fluid end 100, shown in FIG. 1.

The stud 700 has a first threaded section 702 and an opposite second threaded section 704. The threaded sections 702 and 704 are joined by an elongate, cylindrical body 706. The first threaded section 702 is configured for threading into one of the plurality of threaded openings 144 formed in the fluid end body 102. The second threaded section 704 is configured for threading into the threaded opening formed in one of the nuts 152.

The first section 702 may have fewer threads than that of the opening 144. For example, if the opening 144 has 18 internal threads, the first section 702 of the stud 700 may only have 16 external threads. This configuration ensures that all of the threads formed on the first section 702 will be engaged and loaded when the first end 702 is threaded into the opening 144. Engaging all of the threads helps increase the fatigue life of the first end 702 of the stud 700. Likewise, the second section 704 may have fewer external threads than there are internal threads formed in the nut 152. The stud 700 may also be subjected to shot peening on its non-threaded sections prior to its use to help reduce the possibility of fatigue cracks. The stud 700 may have a smooth outer surface prior to performing shot peening operations.

The body 706 of the stud 700 comprises a first section 708 and a second section 710. The first section 708 has a smaller diameter than the second section 710. The retainer element 132 is primarily held on the first section 708 of the stud 700. The diameter of the second section 710 is enlarged so that it may center the washer 150 on the stud 700.

The diameter of the second section 710 is configured so that it is only slightly smaller than the diameter of the central opening of the washer 150. This sizing allows the washer 150 to closely receive the second section 710 of the stud 700 when the washer 150 is positioned on the stud 700. When the washer 150 is positioned on the second section 710, the washer 150 is effectively centered on the stud 700. The washer 150 is also effectively centered against the nut 152 once the nut 152 is installed on the stud 700.

Without placing the washer 150 on the second section 710, the washer may have to be manually centered on the stud 700 prior to installing the nut 152. If the washer 150 is not properly centered on the stud 700 or against the nut 152, it may be difficult to effectively torque or un-torque the nut 152 from the stud 700, depending on the type of washer used.

The plurality of washers used with each fastening system 134, 222, 320, 420, 522, and 626 shown in FIGS. 1, 4, 7, 9, 11, and 14 may be configured to allow a large amount of torque to be imposed on the nuts used with the washers without using a reaction arm. Instead, the washer itself may serve as the counterforce needed to torque a nut onto a stud. Not having to use a reaction arm increases the safety of the assembly process. The nuts used with the fastening systems 134, 222, 320, 420, 522, and 626 may also comprise a hardened inner layer to help reduce galling between the threads of the nuts and studs during the assembly process. An example of the above described washers, nuts, and methods are described in Patent Cooperation Treaty Application Serial No. PCT/US2017/020548, authored by Junkers, et al., the entirety of which is incorporated herein by reference.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A hydraulic fluid pump, comprising:
a fluid end, comprising:
a housing including a first end and a second end opposite the first end, the housing having a plurality of housing bores extending from the first
end to the second end and a plurality of valve bores situated orthogonal to the plurality of housing bores;
a first plate fastened to the housing at its first end, the first plate having at least one plate bore axially aligned with a selected one of the plurality of housing bores;
a plug at least partially disposed within a selected one of the plurality of housing bores and closing the selected one of the plurality of housing bores;
a fastener, threaded to the first plate at the at least one plate bore and retaining the plug within the housing bore;
a packing configured to surround at least a portion of a reciprocating plunger;
a second plate fastened to the housing at its second end, the second plate having at least one plate bore axially aligned with the selected one of the plurality of housing bores; and a component disposed about the packing and retained by the second plate such that the component engages the housing;
wherein the second plate has the same number of plate bores as the number of housing bores of the housing.

2. The hydraulic fluid pump of claim 1, in which the first plate has the same number of plate bores as the number of housing bores of the housing.

3. The hydraulic fluid pump of claim 1, in which the fluid end further comprises a plurality of plungers; in which one of the plurality of plungers is the reciprocating plunger of claim 1; and in which each of the plurality of plungers is at least partially disposed within a corresponding housing bore.

4. The hydraulic fluid pump of claim 1, further comprising a packing nut configured to engage the packing such that the packing nut retains the packing within the component.

5. The hydraulic fluid pump of claim 4, in which the packing nut comprises a central opening configured to receive the reciprocating plunger.

6. The hydraulic fluid pump of claim 1 further comprising a valve pair situated in a selected one of the plurality of valve bores.

7. The hydraulic fluid pump of claim 1, further comprising:
a plug situated in the selected one of the plurality of valve bores; and
an annular seal situated around the plug, the annular seal configured to block fluid from passing by an external surface of the plug.

8. A hydraulic fluid pump, comprising:

a fluid end, comprising:
- a housing including a first end and a second end opposite the first end, the housing having a plurality of housing bores extending from the first end to the second end;
- a first plate fastened to the housing at its first end, the first plate having at least one plate bore axially aligned with a selected one of the plurality of housing bores;
- a plug at least partially disposed within a selected one of the plurality of housing bores and closing the selected one of the plurality of housing bores;
- a fastener, threaded to the first plate at the at least one plate bore and retaining the plug within the housing bore;
- a packing configured to surround at least a portion of a reciprocating plunger;
- a second plate fastened to the housing at its second end, the second plate having at least one plate bore axially aligned with the selected one of the plurality of housing bores;
- a component disposed about the packing and retained by the second plate such that the component engages the housing;
- wherein the second plate has the same number of plate bores as the number of housing bores of the housing; and a power end, the power end configured to drive the reciprocating plunger.

9. A hydraulic fluid pump, comprising:

a fluid end, comprising:
- a housing including a first end and a second end opposite the first end, the housing having a plurality of housing bores extending from the first end to the second end;
- a first plate fastened to the housing at its first end, the first plate having at least one plate bore axially aligned with a selected one of the plurality of housing bores;
- a plug at least partially disposed within the selected one of the plurality of housing bores and closing the selected one of the plurality of housing bores;
- a packing configured to engage a reciprocating plunger;
- a second plate fastened to the housing at its second end, the second plate having at least one plate bore axially aligned with the selected one of the plurality of housing bores; and
- a component disposed about the packing and retained to the housing by the second plate;
- in which the second plate has the same number of plate bores as the number of housing bores of the housing; and a power end connected to the fluid end.

10. The hydraulic fluid pump of claim 9, in which the housing is a single integrally-formed piece.

11. The hydraulic fluid pump of claim 9, in which the first plate has the same number of plate bores as the number of housing bores of the housing.

12. The hydraulic fluid pump of claim 9, in which the second plate has rounded edges.

13. The hydraulic fluid pump of claim 9, in which the housing comprises a plurality of valve bores situated perpendicular to the plurality of housing bores.

* * * * *